(12) United States Patent
Kawamura et al.

(10) Patent No.: US 10,890,787 B2
(45) Date of Patent: Jan. 12, 2021

(54) OPTICAL MODULATOR

(71) Applicant: NIPPON TELEGRAPH AND TELEPHONE CORPORATION, Tokyo (JP)

(72) Inventors: Yuriko Kawamura, Atsugi (JP); Ken Tsuzuki, Atsugi (JP); Kiyofumi Kikuchi, Atsugi (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 90 days.

(21) Appl. No.: 16/081,328

(22) PCT Filed: Mar. 16, 2017

(86) PCT No.: PCT/JP2017/010652
§ 371 (c)(1),
(2) Date: Aug. 30, 2018

(87) PCT Pub. No.: WO2017/159782
PCT Pub. Date: Sep. 21, 2017

(65) Prior Publication Data
US 2019/0025615 A1  Jan. 24, 2019

(30) Foreign Application Priority Data

Mar. 18, 2016 (JP) .................. 2016-056172

(51) Int. Cl.
*G02B 26/00* (2006.01)
*G02F 1/01* (2006.01)
(Continued)

(52) U.S. Cl.
CPC .......... *G02F 1/025* (2013.01); *G02F 1/0356* (2013.01); *G02F 1/225* (2013.01); *G02F 1/2255* (2013.01);
(Continued)

(58) Field of Classification Search
CPC ............... G02B 26/001; G02B 26/105; G02B 26/0841; G02B 6/2766; G02B 27/283;
(Continued)

(56) References Cited

U.S. PATENT DOCUMENTS

2009/0290206 A1  11/2009  Sugiyama
2011/0158576 A1*  6/2011  Kissa .................. G02F 1/225
                                                              385/3
(Continued)

FOREIGN PATENT DOCUMENTS

CN       102472900 A    5/2012
EP       2 453 295 A1   5/2012
(Continued)

OTHER PUBLICATIONS

International Search Report dated Jun. 6, 2017, issued in PCT Application No. PCT/JP2017/010652, filed Mar. 16, 2017.
(Continued)

*Primary Examiner* — Dawayne Pinkney
(74) *Attorney, Agent, or Firm* — Workman Nydegger

(57) ABSTRACT

The MZ type optical modulator of the invention includes: a Si optical modulator including an input optical waveguide, two arm waveguides branching and guiding light input from the input optical waveguide, an output optical waveguide combining the light guided through the two arm waveguides and outputting the combined light, two signal electrodes for applying radio frequency signals that are arranged in parallel to the two arm waveguides respectively, and a DC electrode for applying a bias voltage that is provided between the two signal electrodes; and at least one ground electrode arranged in parallel to the two signal electrodes.

8 Claims, 22 Drawing Sheets

(51) Int. Cl.
  *G02B 26/08* (2006.01)
  *G02B 6/26* (2006.01)
  *G02B 6/10* (2006.01)
  *G02F 1/025* (2006.01)
  *G02F 1/035* (2006.01)
  *G02F 1/225* (2006.01)
  *G02F 1/21* (2006.01)

(52) U.S. Cl.
  CPC ...... *G02F 1/2257* (2013.01); *G02F 2001/212* (2013.01); *G02F 2201/063* (2013.01); *G02F 2201/127* (2013.01)

(58) Field of Classification Search
  CPC ...... G02B 6/122; H04B 10/505; B82Y 20/00; G02F 1/29; G02F 1/03; G02F 1/055; G02F 1/0316; G02F 3/00; G02F 2208/50; G02F 1/3538; G02F 1/025; G02F 1/2255; G02F 1/225; G02F 1/3132
  USPC ........ 359/237–238, 315, 215, 247, 251–252, 359/254, 108, 278–279, 290–292, 298, 359/300–302, 245; 385/1–3, 40, 129–132
  See application file for complete search history.

(56) References Cited

U.S. PATENT DOCUMENTS

| | | |
|---|---|---|
| 2012/0106888 A1 | 5/2012 | Goh et al. |
| 2013/0243364 A1 | 9/2013 | Kanno et al. |
| 2014/0233878 A1 | 8/2014 | Goi et al. |
| 2014/0248019 A1 | 9/2014 | Witzen et al. |
| 2016/0026064 A1 | 1/2016 | Masuyama et al. |
| 2016/0054639 A1 | 2/2016 | Kono |
| 2017/0184802 A1* | 6/2017 | Saeki .................. G02B 6/4225 |

FOREIGN PATENT DOCUMENTS

| | | |
|---|---|---|
| EP | 3 333 619 A1 | 6/2018 |
| JP | 2003-243777 A | 9/2003 |
| JP | 2003-348022 A | 12/2003 |
| JP | 2004-70130 A | 3/2004 |
| JP | 2010-152306 A | 7/2010 |
| JP | 2012-27199 A | 2/2012 |
| JP | 2012-78496 A | 4/2012 |
| JP | 2016-31377 A | 3/2016 |
| WO | 2013/062096 A1 | 5/2013 |
| WO | 2015/151978 A1 | 10/2015 |

OTHER PUBLICATIONS

International Preliminary Report on Patentability dated Sep. 27, 2018, issued in PCT Application No. PCT/JP2017/010652, filed Mar. 16, 2017.

Kazuhiro Goi et al., *20Gbps Binary Phase Shift Keying Using Silicon Mach-Zehnder Push-Pull Modulator*, The Institute of Electronics, Information, and Communications Engineers, Electronics Society Conference in 2012, C-3-50, pp. 2.

Po Dong et al., *High-Speed Low-Voltage Single-Drive Push-Pull Silicon Mach-Zehnder Modulators*, Optics Express, vol. 20, No. 6, Feb. 29, 2012, pp. 6163-6169.

N. Wolf et al., *Electro-Optical Co-Design to Minimize Power Consumption of a 32 GBd Optical IQ-Transmitter Using InP MZ-Modulators*, Compound Semiconductors Integrated Circuite Symposium (CSICS), IEEE Oct. 2015, pp. 1-4, 11-14.

European Search Report dated Oct. 2, 2019, issued in EP Application No. 17766778.9.

* cited by examiner

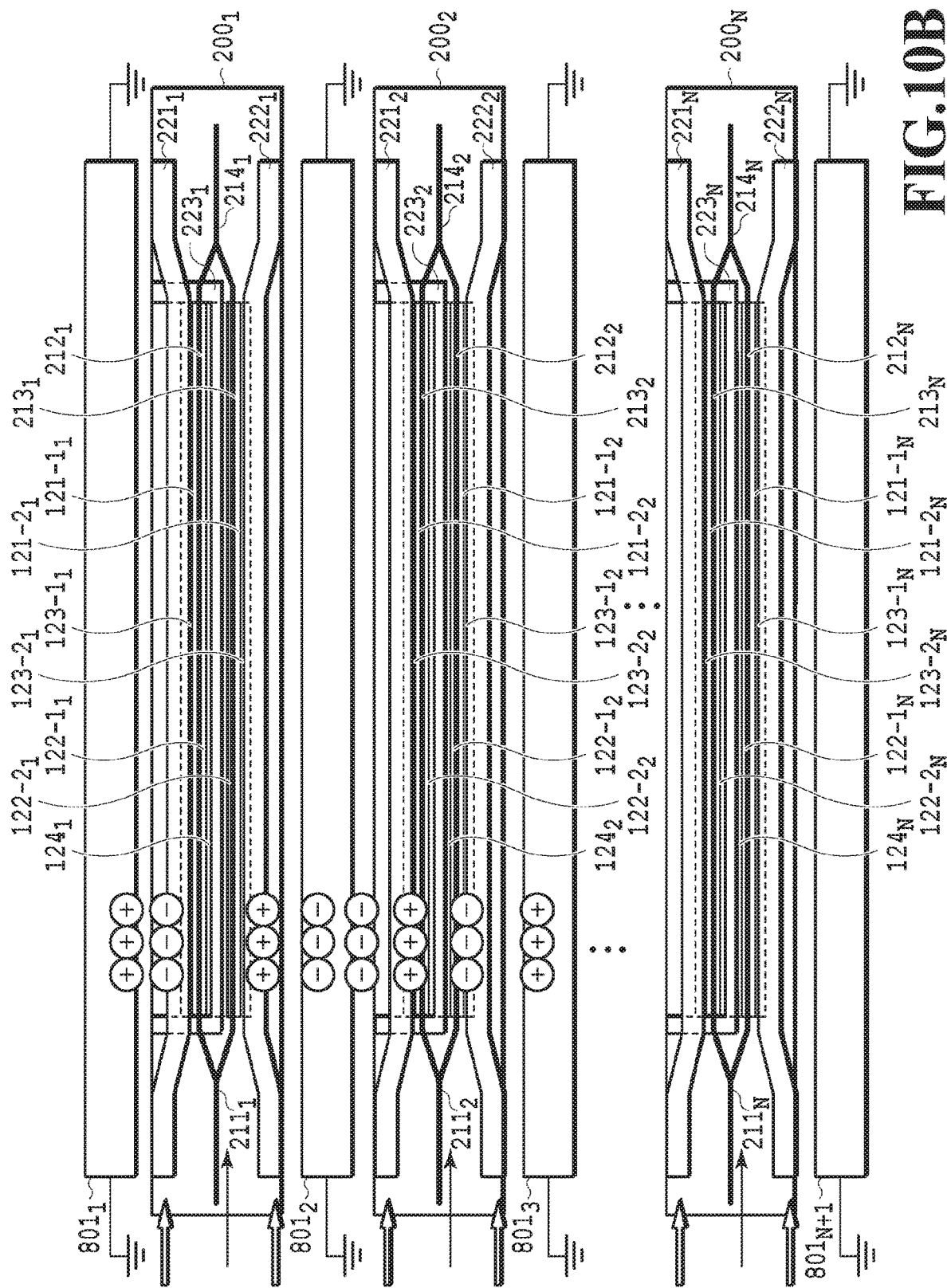

OPTICAL MODULATOR

TECHNICAL FIELD

The present invention relates to an optical modulator used for an optical communication system or an optical information processing system, and more particularly, to an optical modulator excellent in frequency characteristics used when performing optical modulation operation at high speed.

BACKGROUND ART

A Mach-Zehnder (MZ) type optical modulator has a structure of branching light incident on an optical waveguide into two waveguides with an intensity ratio of 1:1, propagating the branched light for a certain length, and then recombining the branched light. By changing phases of the two light beams by phase modulation units provided in the two branched optical waveguides, interference condition of the light at the time of combination of the light is changed, so that the intensity and phase of the light can be modulated. By inputting a modulated electric signal to a phase modulation electrode arranged in the vicinity of the optical waveguide and applying a voltage to the optical waveguide, the phase of the light propagating through the optical waveguide can be changed.

In the MZ type optical modulator, a dielectric material such as LiNbO3 or a semiconductor such as InP, GaAs, or Si is used as a material constituting the optical waveguide. An electrode is arranged in the vicinity of the optical waveguide configured with such a material, and by inputting a modulated electric signal to the electrode and applying a voltage to the optical waveguide, the phase of the light propagating through the optical waveguide is changed. As the principle of changing the phase of light, the Pockels effect is mainly used in LiNbO3, the Pockels effect and the quantum confined stark effect (QCSE) are mainly used in InP and GaAs, and the carrier plasma effect is mainly used in Si.

In order to perform low power consumption optical communication at a high speed, an optical modulator having a high modulation speed and a low driving voltage is required. In order to perform optical modulation with an amplitude voltage of several volts at a high speed of 10 Gbps or more, a traveling wave electrode is required to match the speed of the high-speed electric signal and the speed of the light propagating through the phase modulator and perform the interaction while propagating the light and the electric signal.

An optical modulator in which the length of the electrode is set to several millimeters to several tens of millimeters using a traveling wave electrode has been put to practical use (refer to, for example, NPL 1). In the optical modulator having the traveling wave electrode, an electrode structure and an optical waveguide structure with low loss and low reflection are required so as to be able to propagate without decreasing of the intensity of the electric signal or the light propagating through the optical waveguide.

In addition, as the MZ type optical modulator, there is a Si optical modulator in which an optical waveguide is made of Si. The Si optical modulator is configured to include a silicon on insulator (SOI) substrate in which a thin film of Si is attached on an oxide film (BOX) layer obtained by thermally oxidizing the surface of the Si substrate. The Si optical modulator can be manufactured by processing the Si thin film into a thin line on the BOX layer so that the light can be guided through the SOI layer, by injecting dopants into the thin Si thin film so as to be a p-type/n-type semiconductor, and performing deposition of SiO2 to be a clad layer of light and formation of electrodes, and the like. At this time, it is necessary to design and process the optical waveguide so as to reduce light loss. In addition, it is necessary to perform p-type and n-type doping and manufacture electrode so as to suppress occurrence of light loss and suppress reflection and loss of high-speed electric signals to a small level.

FIG. 1 illustrates a cross-sectional structural diagram of an optical waveguide which is a basis of a Si optical modulator in the related art. In FIG. 1, an optical waveguide structure 100 configured to include a lower SiO2 clad layer 110, a Si layer 120 provided on the lower SiO2 clad layer 110, and an upper SiO2 clad layer 130 provided on the Si layer 120 is illustrated. In FIG. 1, it is assumed that light propagates in the direction perpendicular to the paper surface.

In the optical waveguide structure 100 of the Si optical modulator illustrated in FIG. 1, the Si layer 120 has a structure called a rib waveguide which has a difference in thickness in order to confine light and is configured to include a rib portion 101 which is a core layer of a thick central portion and slab portions 102 and 103 on both sides of the rib portion 101. The rib portion 101 confines the light propagating in the direction perpendicular to the paper surface by using the difference in refractive index between the lower SiO2 clad layer 110 and the upper SiO2 clad layer 130 around the rib portion.

The end portion of the slab portion 102 of the Si layer 120 on the side opposite to the rib portion 101 is a high-concentration p-type semiconductor region 123. The end portion of the slab portion 103 of the Si layer 120 on the side opposite to the rib portion 101 is a high-concentration n-type semiconductor region 124. The rib portion 101 side of the slab portion 102 of the Si layer 120 and the slab portion 102 side of the rib portion 101 are a medium-concentration p-type semiconductor region 121. In addition, the rib portion 101 side of the slab portion 103 of the Si layer 120 and the slab portion 103 side of the rib portion 101 are a medium-concentration n-type semiconductor region 122.

The high-concentration p-type semiconductor region 123 and the medium-concentration p-type semiconductor region 121 are in contact with each other at a boundary, and the high-concentration n-type semiconductor region 124 and the medium-concentration n-type semiconductor region 122 are also in contact with each other at a boundary. These boundaries may be overlapped and doped. In addition, the rib portion 101 has a pn junction structure in which the medium-concentration p-type semiconductor region 121 and the medium-concentration n-type semiconductor region 122 are in contact with each other. In addition, as another example, a pin junction structure in which an i-type (intrinsic) semiconductor region is interposed between the medium-concentration p-type semiconductor region 121 and the medium-concentration n-type semiconductor region 122 may be adopted.

Although not illustrated in FIG. 1, a metal electrode in contact with the high-concentration p-type semiconductor region 123 and a metal electrode in contact with the high-concentration n-type semiconductor region 124 are provided, and a reverse bias electric field (right to left in FIG. 1) together with a radio frequency (RF) modulated electric signal is applied from the metal electrode to the pn junction portion. Therefore, the carrier density inside the core layer of the optical waveguide structure 100 is changed, and the phase of the light can be modulated by changing the refractive index of the optical waveguide (carrier plasma effect).

Since the dimension of the waveguide depends on the refractive index of the core/clad material, the dimension of the waveguide cannot be uniquely determined. However, as an example in the case of the rib waveguide structure having the rib portion (core layer) 101 and the slab portions 102 and 103 of the optical waveguide structure 100 as illustrated in FIG. 1, the dimension of the waveguide is about the width of the rib portion 101 (waveguide core width) being 400 to 600 (nm)×the height thereof being 150 to 300 (nm)×the thickness of the slab portion being 50 to 200 (nm)×the length thereof being several millimeters (mm).

FIG. 2 is a top perspective view illustrating the configuration of the Si optical modulator. A Si optical modulator 200 illustrated in FIG. 2 is an MZ type optical modulator having a structure called a single electrode (refer to, for example, NPL 2). As illustrated in FIG. 2, the Si optical modulator 200 includes an input optical waveguide 211, two arm waveguides 212 and 213 that branch and guide light input from the input optical waveguide 211, and an output optical waveguide 214 that combines the light guided through the arm waveguide 212 and the light guided through the arm waveguide 213 and outputs the combined light.

A radio frequency line (signal electrode) 221 for inputting a differential modulated electrical signal (RF signal) is formed beside the substrate edge side of the arm waveguide 212. A signal electrode 222 for inputting a differential RF signal is also formed beside the substrate edge side of the arm waveguide 213. A DC electrode 223 for applying a common bias voltage is formed between the arm waveguide 212 and the arm waveguide 213. The arm waveguides 212 and 213 have a structure in which two optical waveguides having a cross-sectional structure similar to those of the optical waveguide structure 100 illustrated in FIG. 1 are arranged symmetrically in the lateral direction.

In the Si optical modulator 200 illustrated in FIG. 2, the light input from the input optical waveguide 211 is branched into the arm waveguides 212 and 213. The light guided through the arm waveguide 212 is phase-modulated by a modulated electric signal (RF signal) applied between the signal electrode 221 and the DC electrode 223. The light guided through the arm waveguide 213 is phase-modulated by a modulated electric signal (RF signal) applied between the signal electrode 222 and the DC electrode 223. The phase-modulated light guided through the arm waveguide 212 and the phase-modulated light guided through the arm waveguide 213 are coupled to be output from the output optical waveguide 214.

FIG. 3 is a cross-sectional view taken along line III-III of the Si optical modulator 200 illustrated in FIG. 2. As illustrated in FIG. 3, the Si optical modulator 200 includes a SiO2 clad layer 110, a Si layer 120 formed on the SiO2 clad layer 110, and a SiO2 clad layer 130 formed on the Si layer 120. The Si layer 120 has a first rib portion 101-1 to be a first core layer, a second rib portion 101-2 to be a second core layer, a first slab portion 102-1 arranged on the side opposite to the second rib portion 101-2 of the first rib portion 101-1, a second slab portion 102-2 arranged on the side opposite to the first rib portion 101-1 of the second rib portion 101-2, and a third slab portion 103 arranged between the first rib portion 101-1 and the second rib portion 101-2.

The end portion of the first slab portion 102-1 on the side opposite to the first rib portion 101-1 is a high-concentration p-type semiconductor region 123-1. The first rib portion 101-1 side of the first slab portion 102-1 and the first slab portion 102-1 side of the first rib portion 101-1 are a middle-concentration p-type semiconductor region 121-1. The first rib portion 101-1 side of the third slab portion 103 and the third slab portion 103 side of the first rib portion 101-1 is a medium-concentration n-type semiconductor region 122-1.

In addition, the end portion of the second slab portion 102-2 on the side opposite to the second rib portion 101-2 is a high-concentration p-type semiconductor region 123-2. The second rib portion 101-2 side of the second slab portion 102-2 and the second slab portion 102-2 side of the second rib portion 101-2 are a medium-concentration p-type semiconductor region 121-2. The second rib portion 101-2 side of the third slab portion 103 and the third slab portion 103 side of the second rib portion 101-2 are a medium-concentration n-type semiconductor region 122-2. A high-concentration n-type semiconductor region 124 is formed between the medium-concentration n-type semiconductor regions 122-1 and 122-2 in the third slab portion 103.

The signal electrode 221 is in contact with the high-concentration p-type semiconductor region 123-1. The signal electrode 222 is in contact with the high-concentration p-type semiconductor region 123-2. The DC electrode 223 is in contact with the high-concentration n-type semiconductor region 124. By applying a positive voltage in the DC electrode 223 to the signal electrodes 221 and 222, a reverse bias can be applied to the two pn junctions on both sides of the DC electrode 223.

FIGS. 4A and 4B are diagrams illustrating the relationship between the semiconductor doping state of the Si layer 120 illustrated in FIG. 3 and the band diagram at the time of optical modulation. FIG. 4A illustrates the semiconductor doping state of the Si layer 120 in the III-III cross section, and FIG. 4B illustrates the band diagram at the time of optical modulation.

In the Si optical modulator 200 having a single electrode as illustrated in FIG. 3, the signal electrodes 221 and 222 and the DC electrode 223 are electrically independent from each other, and when a reverse bias is applied to the pn junction, it is not necessary to positively apply the bias voltage to the signal electrodes 221 and 222. For this reason, a bias tee for applying a bias to the signal electrodes 221 and 222, a capacitor for DC blocks provided between the driver IC and the signal electrodes 221 and 222, and the like become unnecessary, so that there is a merit in that the configuration can be simplified.

In addition, in the Si optical modulator 200 illustrated in FIG. 3, the example has been described in which the signal electrodes 221 and 222 are in contact with the high-concentration p-type semiconductor regions 121-1 and 121-2 and the DC electrode 223 is in contact with the high-concentration n-type semiconductor region 124, but the signal electrode may be in contact with the n-type semiconductor region and the DC electrode may be in contact with the p-type semiconductor region. At this time, by applying a negative voltage to the signal electrode, as a bias voltage applied to the DC electrode, a reverse bias can be applied to the pn junction portion.

In the Si optical modulator having a single electrode as illustrated in FIGS. 2 to 4A, the signal electrodes 221 and 222 are formed with a coplanar strip line (CPS line). FIG. 5 is a plan view illustrating the structure of the CPS line. In a CPS line 500 illustrated in FIG. 5, differential electric signals are input to and propagated through two radio frequency electrodes 501 and 502. In electromagnetism, as illustrated in FIG. 5, when a dense portion of electric charges in a radio frequency signal moves like a wave on radio frequency propagation line, a dense portion of electric charges of which positive and negative are opposite is induced by Coulomb interaction in the ground electrode or a pair of electrodes of a differential line. As a model, it can be understood that the induced electric charges move in the same manner as the radio frequency signal. The CPS line is one of the balanced lines in which positive and negative electric charges are balanced with the two electrodes, which form a pair of differential lines.

FIG. 6 is a plan view illustrating the structure of the CPS line of the Si optical modulator 200 illustrated in FIG. 2. As illustrated in FIG. 6, in the Si optical modulator 200, the DC electrode 223 is inserted between two signal electrodes 221 and 222 which are CPS lines. Positive and negative electric charges induced by Coulomb interaction from the radio frequency signal are also generated in the DC electrode 223.

CITATION LIST

Non Patent Literature

NPL 1: Kazuhiro Goi, Kenji Oda, Hiroyuki Kusaka, Kensuke Ogawa, Tsung-Yang Liow, Xiaoguang Tu, Guo-Qiang Lo, Dim-Lee Kwong, "20 Gbps binary phase shift keying using silicon Mach-Zehnder push-pull modulator", The Institute of Electronics, Information and Communication Engineers, Electronics Society Conference in 2012, C-3-50, 2012.

NPL 2: Po Dong, Long Chen, Young-kai Chen, "High-speed low-voltage single-drive push-pull silicon Mach-Zehnder modulators" Opt. Express vol. 20, no. 6, pp. 6163-6169, 2012.

NPL 3: N. Wolf, L. Yan, J.-H. Choi, T. Kapa, S. Wunsch, R. Klotzer, K.-O. Velthaus, H.-G. Bach, M. Schell, "Electro-Optical Co-Design to Minimize Power Consumption of a 32 GBd Optical IQ-Transmitter Using InP MZ-Modulators" in Compound Semiconductor Integrated Circuit Symposium (CSICS), 2015 IEEE, pp. 1-4, 11-14 October 2015

SUMMARY OF INVENTION

Technical Problem

In order to perform high-capacity optical communication, an optical modulator capable of optical modulation at a high speed is required. In order to perform optical modulation a high speed, frequency characteristics that can operate over a wide frequency band from several hundred kHz to several tens GHz are required.

FIG. 7 is an explanatory diagram in a case where another electrode exists in the vicinity of the signal electrode of the Si optical modulator. If there is a conductive structure such as another signal electrode or a DC electrode in the vicinity of the signal electrode of the Si optical modulator, as illustrated in FIG. 7, a dense portion of positive or negative electric charges induced by the radio frequency signal propagating through the signal electrode 222 occurs in the structure close to the signal electrode 222. The electric charges induced in a structure 701 move like a wave together with the propagation of the radio frequency signal propagating through the signal electrode 222.

When the size of the structure 701 is close to a multiple of ½ of the wavelength of the radio frequency signal, in some cases, the wave of the induced electric charges resonates inside the structure 701. In a case where the resonance occurs inside the structure 701, a deterioration in propagation characteristic such as leakage of energy to the structure 701, an increase in reflection, or an increase in transmission loss occurs in the radio frequency signal propagating through the signal electrodes 221 and 222. The deterioration in propagation characteristic of the radio frequency signal leads to adverse effects such as a deterioration in waveform quality at the time of high speed modulation due to a deterioration in frequency response characteristic of the optical modulator, and an increase in signal crosstalk in the transmission light signal or between transmission and reception.

In order to prevent such adverse effects, it is also possible to take measures that a conductive structure such as another signal electrode or a DC electrode is not arranged around the signal electrodes 221 and 222. However, in that case, a conductive structure such as a DC electrode is arranged at a different position away from the signal electrodes 221 and 222, so that a corresponding space is taken, and there is also an empty space around the signal electrodes 221 and 222. Therefore, a driver for driving the modulator of the bias voltage, an optical receiver for the receiver, a transimpedance amplifier, or the like cannot be integrated at a high density.

The invention has been made in view of the above problems, and an object of the invention is to provide an optical modulator where, even in a case where a DC electrode is arranged around a signal electrode, a deterioration in frequency response characteristic is suppressed by suppressing a resonance phenomenon between electrodes in the vicinity of a radio frequency electrode in a radio frequency signal propagating through the radio frequency electrode of the optical modulator, and a waveform quality at the time of high speed modulation is improved, signal crosstalk in the transmission light signal or between transmission and reception can be reduced, and various elements can be integrated at a high density.

Solution to Problem

An MZ type optical modulator according to one embodiment of the invention includes: a Si optical modulator including an input optical waveguide, two arm waveguides branching and guiding light input from the input optical waveguide, an output optical waveguide combining the light guided through the two arm waveguides and outputting the combined light, two signal electrodes for applying radio frequency signals that are arranged in parallel to the two arm waveguides respectively, and a DC electrode for applying a bias voltage that is provided between the two signal electrodes; and at least one ground electrode arranged in parallel to the two signal electrodes.

Advantageous Effects of Invention

In an MZ type optical modulator according to the invention, since a ground electrode is arranged in parallel to a signal electrode, it is possible to reduce an electric field interacting with a surrounding conductor. Therefore, even in a case where a DC electrode is arranged around the signal electrode, it is possible to prevent a deterioration in propagation characteristic such as leakage of energy in a radio frequency signal due to resonance, an increase in reflection, and an increase in transmission loss, and it is possible to solve adverse effects such as a deterioration in waveform quality at the time of high speed modulation due to a deterioration in frequency response characteristic of an optical modulator, and increase in signal crosstalk in the transmission light signal or between transmission and reception. Therefore, it is possible to provide an optical modulator

BRIEF DESCRIPTION OF DRAWINGS

FIG. 10B is a plan view illustrating another example of the configuration of the MZ type optical modulator according to the second embodiment of the invention;

DESCRIPTION OF EMBODIMENTS

First Embodiment

Figure 1:
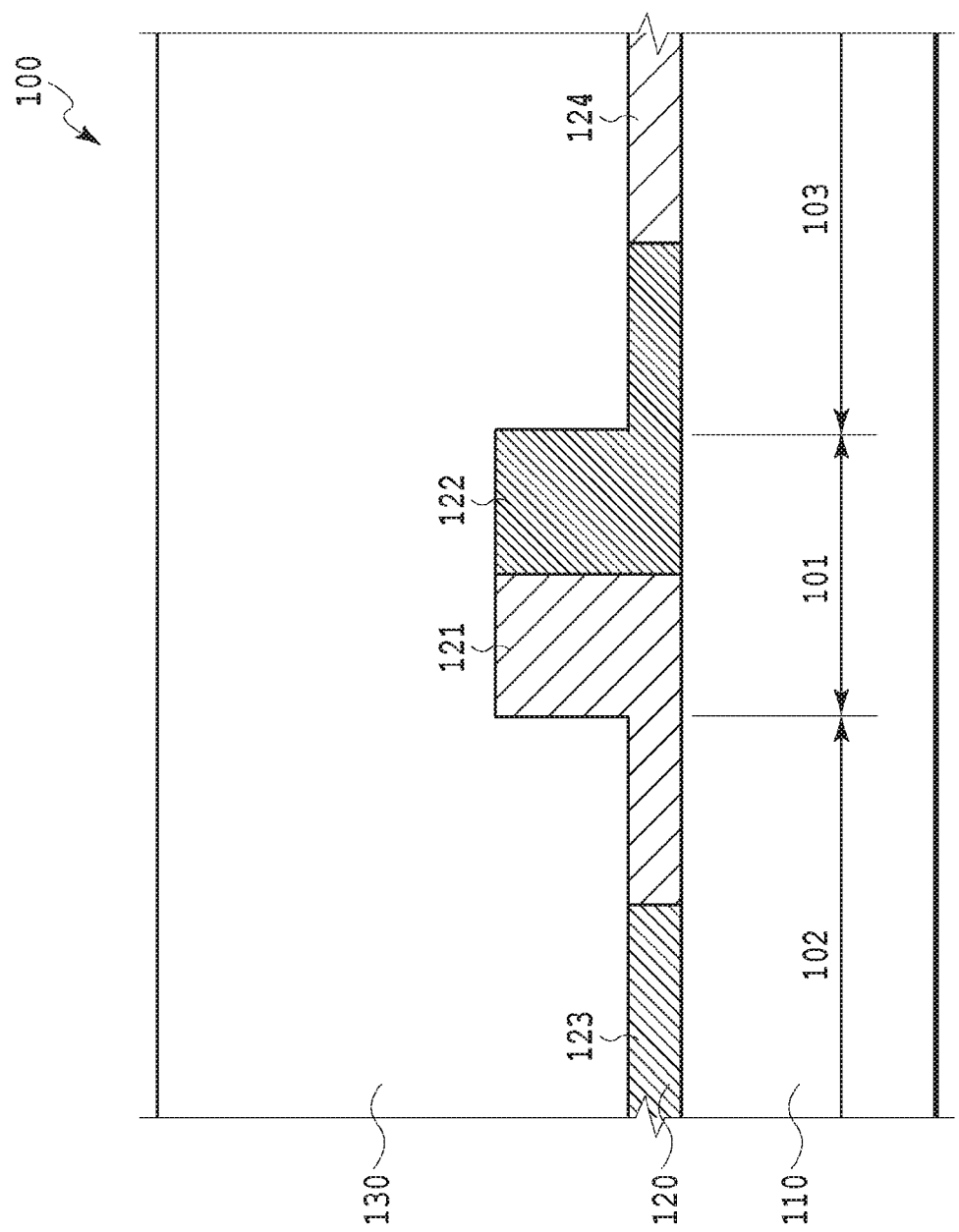
FIG. 1 is a cross-sectional structural diagram of an optical waveguide of a Si optical modulator in the related art.
Figure 2:
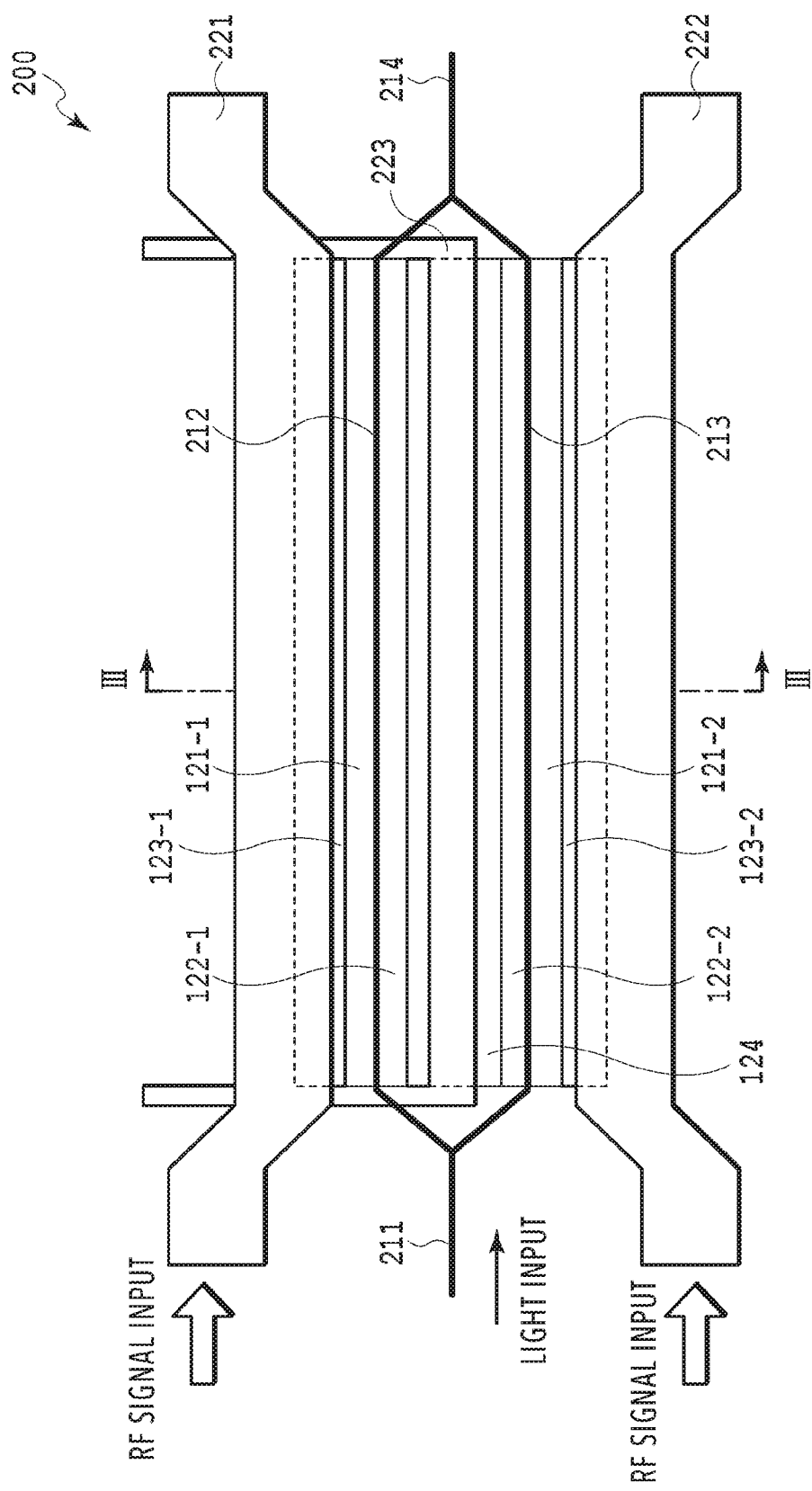
FIG. 2 is a plan view of a Si optical modulator constituting an MZ modulator in the related art.
Figure 3:
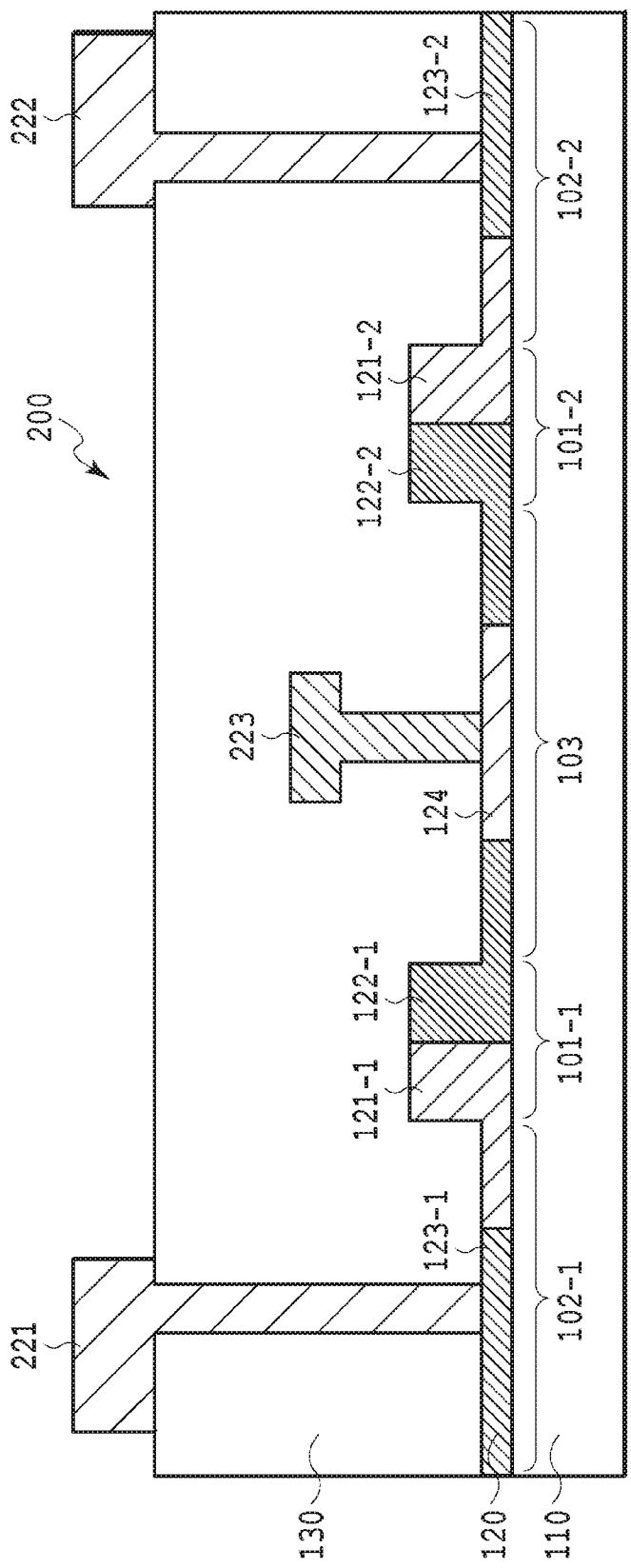
FIG. 3 is a cross-sectional structural diagram of the Si optical modulator illustrated in FIG. 2.
Figure 4A:
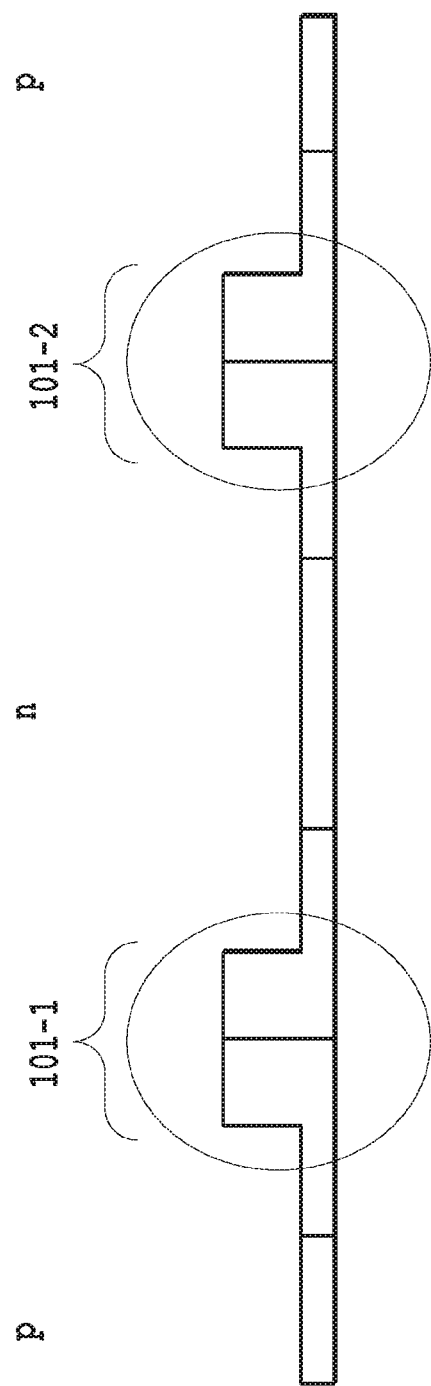
FIG. 4A is a diagram illustrating a semiconductor doping state in a cross section of the Si optical modulator illustrated in FIG. 2.
Figure 4B:
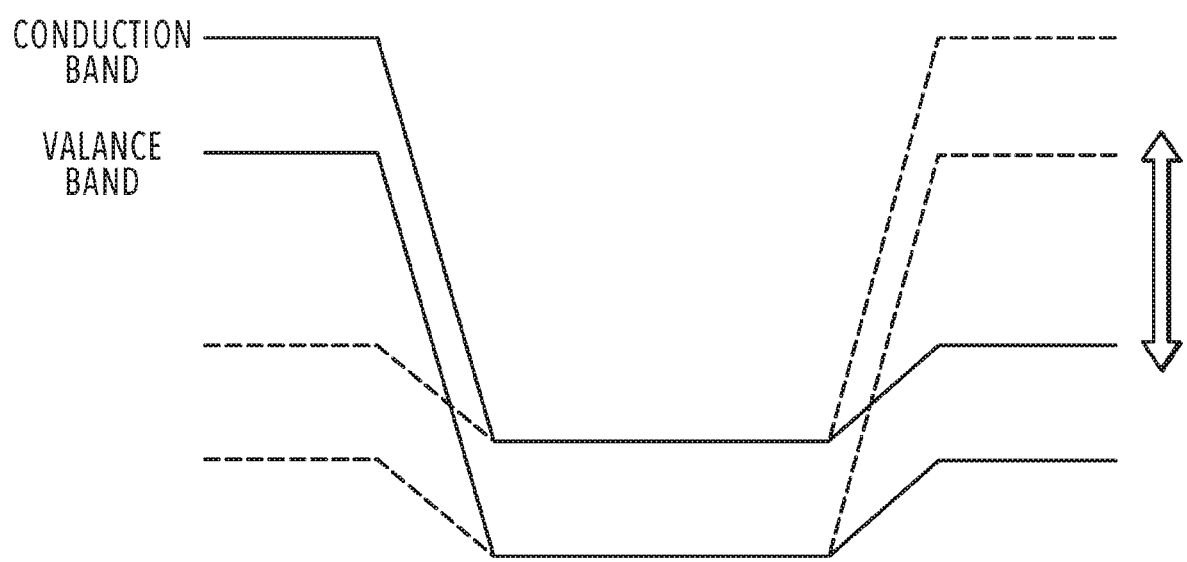
FIG. 4B is a band diagram at the time of optical modulation of the Si optical modulator illustrated in FIG. 2.
Figure 5:
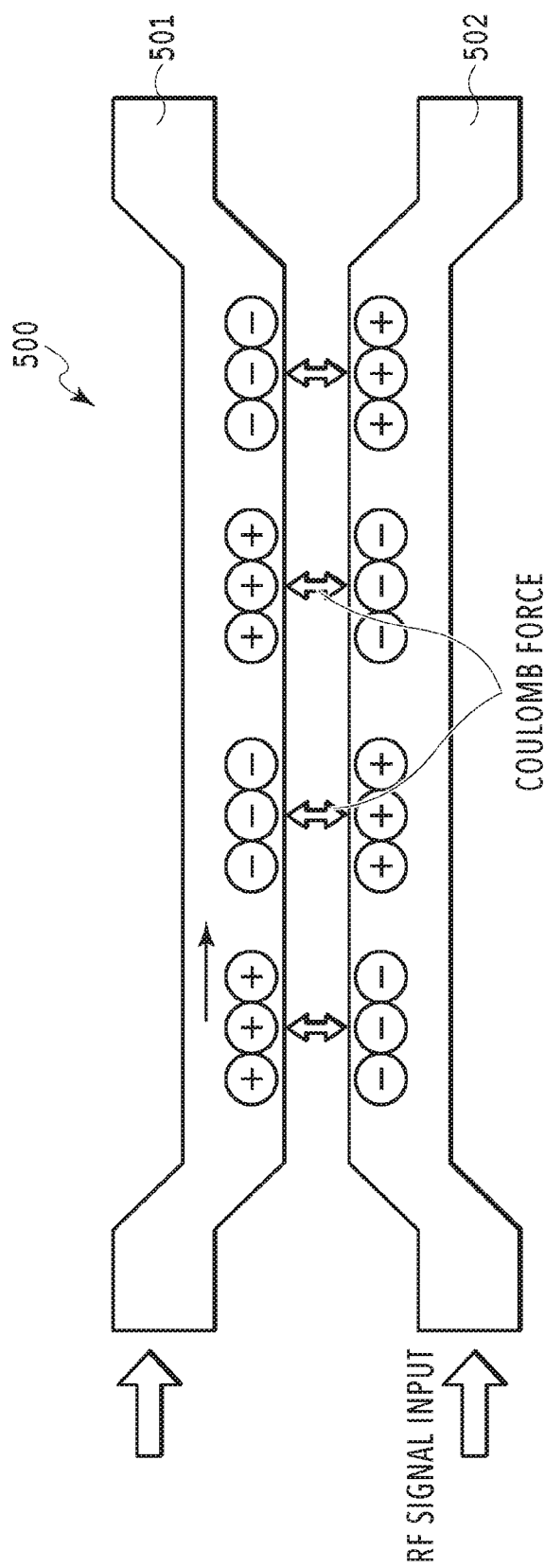
FIG. 5 is a schematic diagram illustrating a state of propagation of a radio frequency signal of a CPS line.
Figure 6:
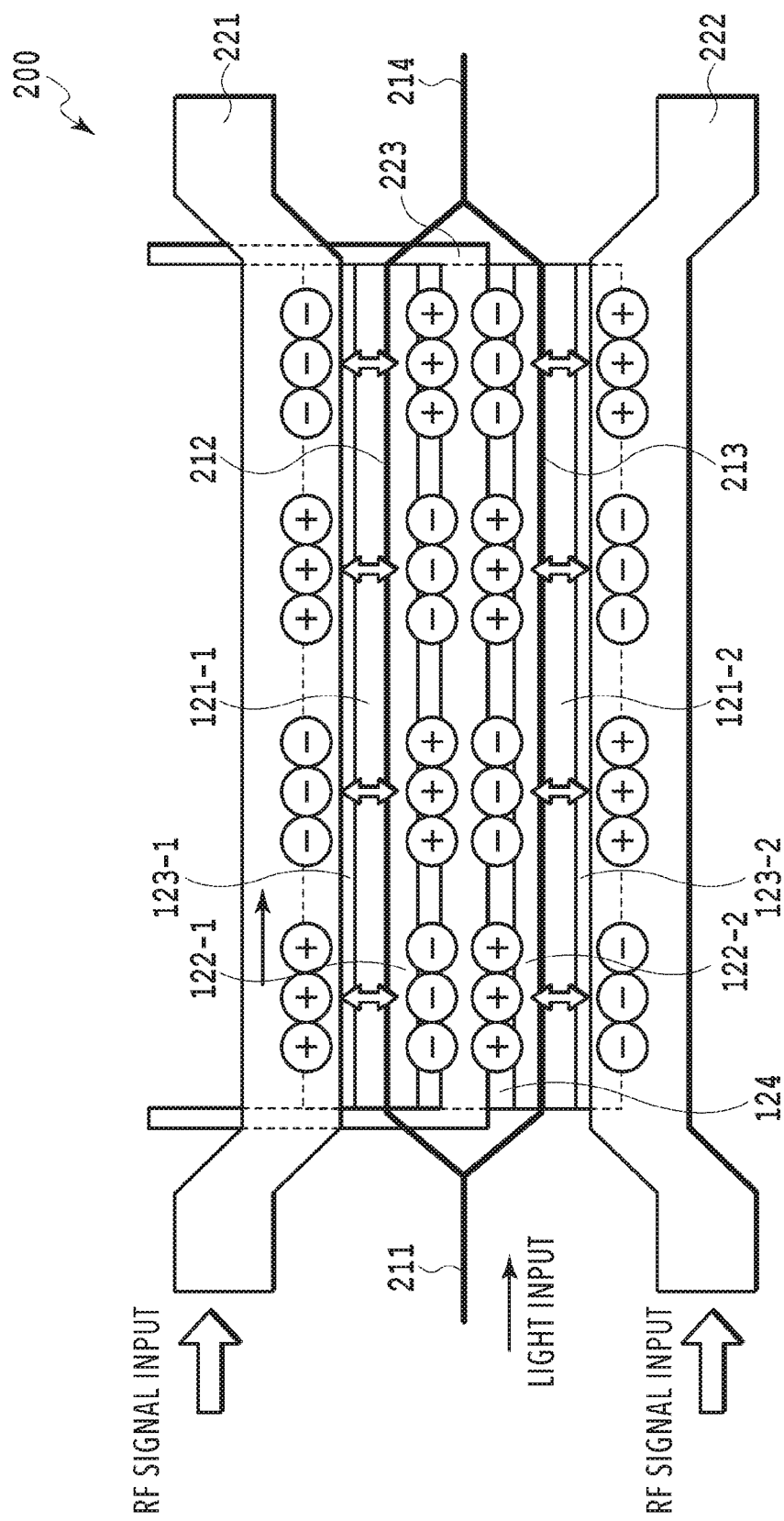
FIG. 6 is a schematic diagram illustrating a state of propagation of a radio frequency signal on a CPS line of a Si optical modulator.
Figure 7:
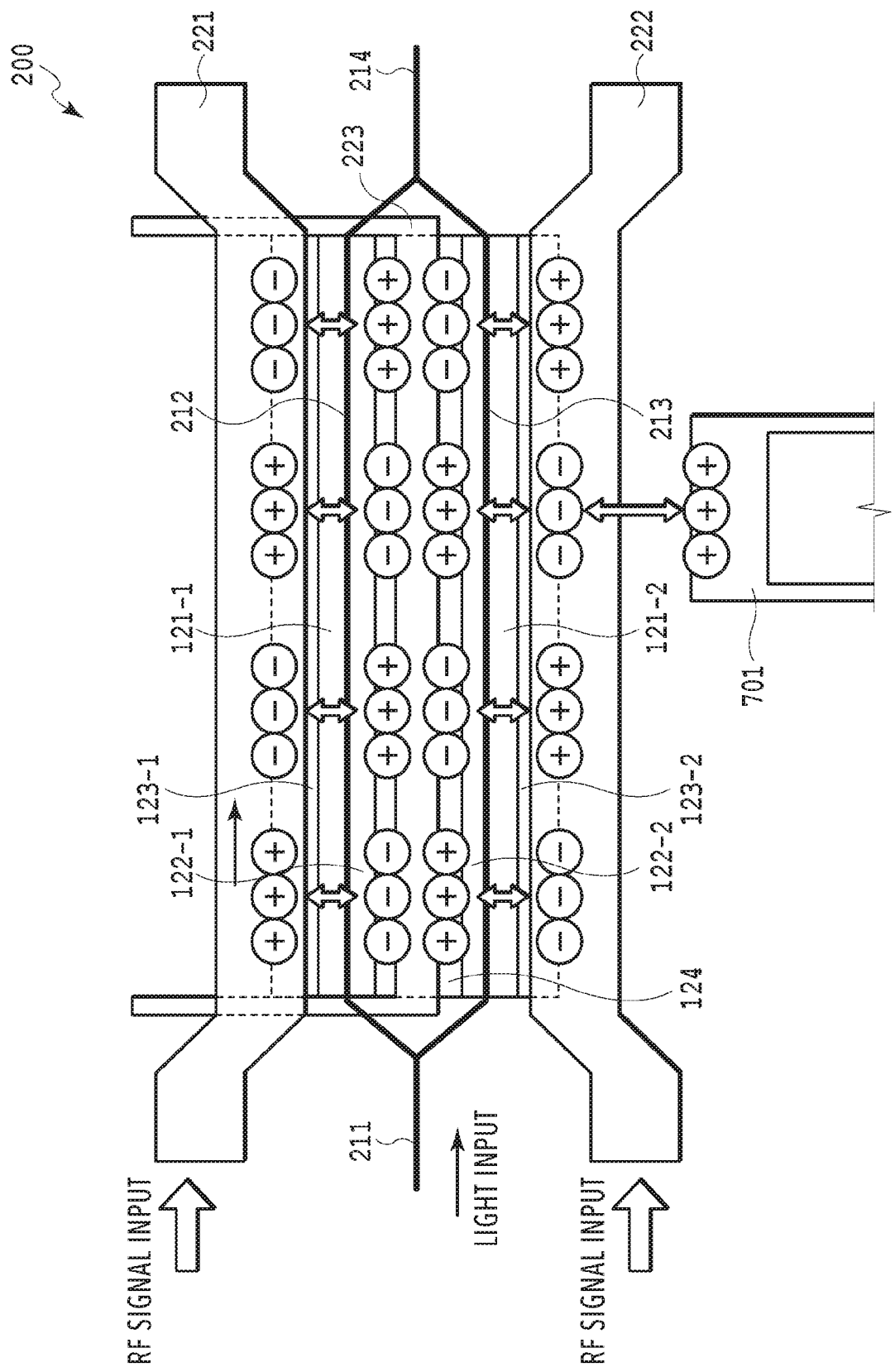
FIG. 7 is a schematic diagram illustrating a state of propagation of a radio frequency signal on a CPS line of a Si optical modulator and a state of electric charges induced in an electrode in the vicinity of the CPS line.
Figure 8:
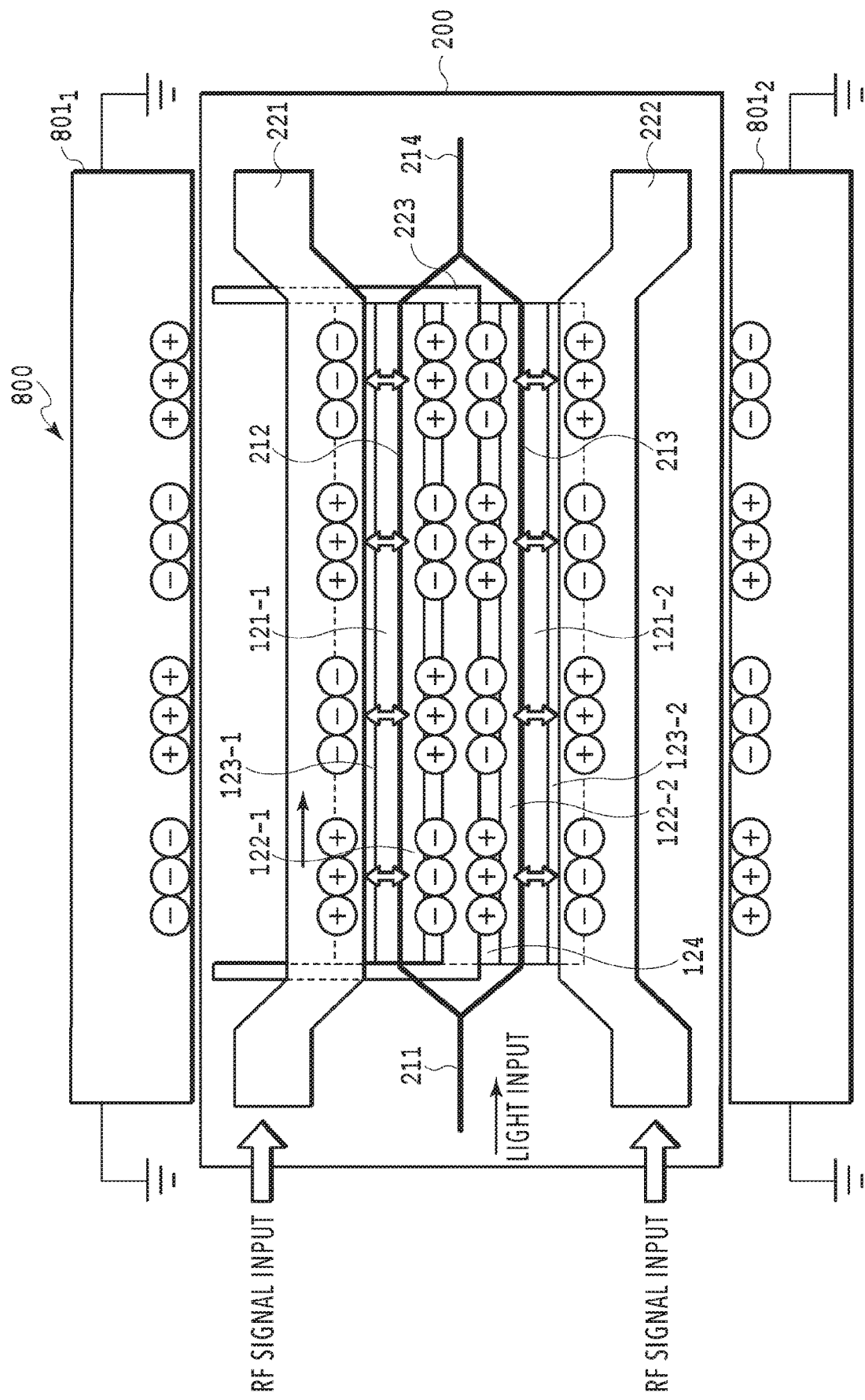
FIG. 8 is a plan view illustrating a configuration of an MZ type optical modulator according to a first embodiment of the invention.

FIG. 8 is a plan view illustrating a configuration of an MZ type optical modulator according to a first embodiment of the invention. As illustrated in FIG. 8, the MZ type optical modulator 800 according to the first embodiment of the invention includes a Si optical modulator 200 having a single electrode structure, a ground electrode 8011 arranged in parallel to a signal electrode 221, and a ground electrode 8012 arranged in parallel to a signal electrode 222. The Si optical modulator 200 includes an input optical waveguide 211, two arm waveguides 212 and 213 that branch and guide light input from the input optical waveguide 211, and an output optical waveguide 214 that combines the light guided through the arm waveguide 212 and the light guided through the arm waveguide 213 and outputs the combined light. The Si optical modulator 200 may be, for example, an MZ type optical modulator having a structure called a single electrode.

The signal electrodes 221 and 222 are arranged in parallel to the two arm waveguides, respectively, in order to apply differential radio frequency signals. A DC electrode 223 for applying a common bias voltage is formed between the arm waveguide 212 and the arm waveguide 213.

The ground electrodes 8011 and 8012 are manufactured in the same process as the signal electrodes 221 and 222. In the ground electrodes 8011 and 8012, both side ends thereof are connected to ground electrodes in a package or the like with the wire interconnections, so that the ground potential is realized. For example, a pair of differential signal voltages may be applied to the signal electrodes 221 and 222.

In the Si optical modulator 200 illustrated in FIG. 8, the light input from the input optical waveguide 211 is branched into the arm waveguides 212 and 213. The light guided through the arm waveguide 212 is phase-modulated by RF signal applied between the signal electrode 221 and the DC electrode 223. The light guided through the arm waveguide 213 is phase-modulated by RF signal applied between the signal electrode 222 and the DC electrode 223. The phase-modulated light guided through the arm waveguide 212 and the phase-modulated light guided through the arm waveguide 213 are coupled to be output from the output optical waveguide 214.

When the situation where the radio frequency signals are applied to the signal electrodes 221 and 222 is represented by an electric charge generation model, it can be considered that the electric charges are induced as illustrated in FIG. 8. As illustrated in FIG. 8, the electric charges induced on the signal electrodes 221 and 222 induce electric charges having opposite signs at the ground electrodes 8011 and 8012, respectively, due to an electric field generated around the signal electrodes 221 and 222. At this time, among the electric fields around the electric charges on the signal electrodes 221 and 222, most of the electric fields generated outside the Si optical modulator 200 are coupled to the ground electrodes 8011 and 8012. Therefore, in a case in which a conductor is arranged around the Si optical modulator 200, the electric field in the vicinity of the conductor is decreased, so that a leakage amount of the signal to the surrounding conductor can be reduced.

Figure 9:
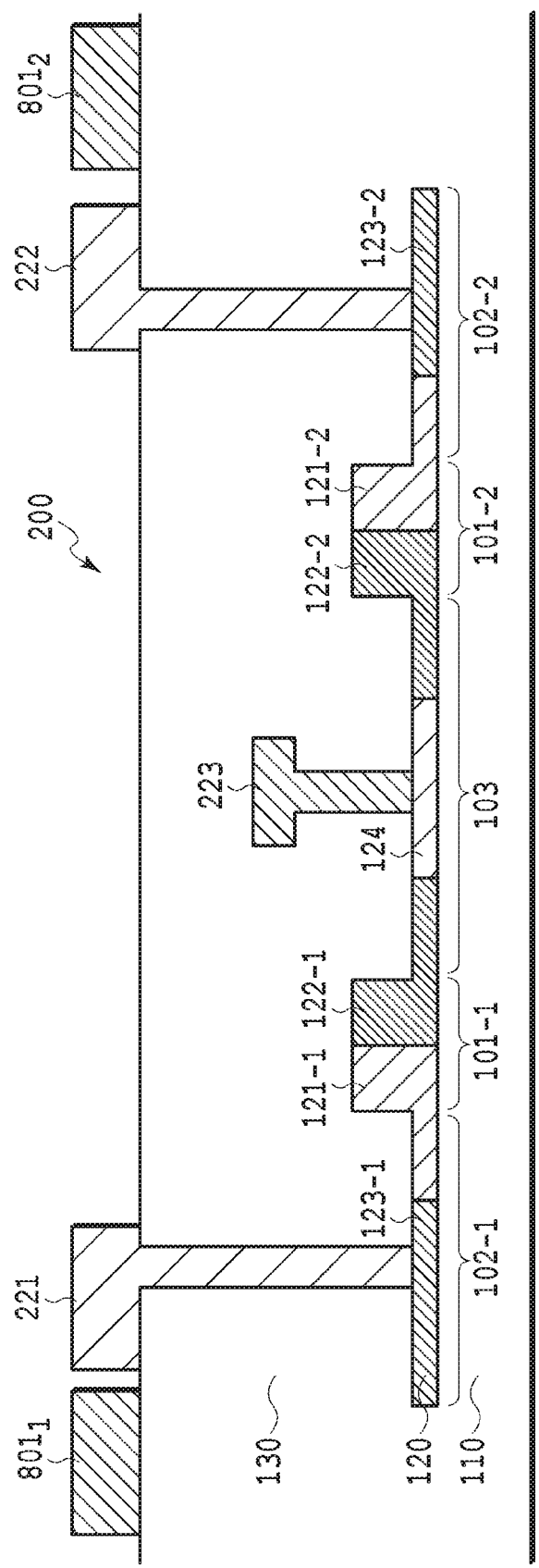
FIG. 9 is a cross-sectional view illustrating a configuration of an MZ type optical modulator according to the first embodiment of the invention.

FIG. 9 is a cross-sectional view illustrating the configuration of the MZ type optical modulator according to the first embodiment of the invention. Although the ground electrodes 8011 and 8012 are manufactured on a SiO2 clad layer 130 by surface interconnections as illustrated in FIG. 9 in this embodiment, the ground electrodes may be manufactured in the SiO2 clad layer 130 by using multilayer interconnections. In addition, although the ground electrodes 8011 and 8012 are formed by adopting a rectangular shape as illustrated in FIG. 8 in this embodiment, any shape may be adopted, and an arbitrary shape such as a shape easy to manufacture in the process may be adopted. In addition, the ground electrodes 8011 and 8012 may be divided into a plurality of electrodes, and in that case, each of the ground electrodes needs to be connected to each of ground electrode in a package or the like by wire interconnections. Furthermore, although the two ground electrodes 8011 and 8012 are arranged in parallel to the respective signal electrodes 221 and 222 in this embodiment, the ground electrode may be arranged for only one of the signal electrodes 221 and 222.

Second Embodiment

Figure 10A:
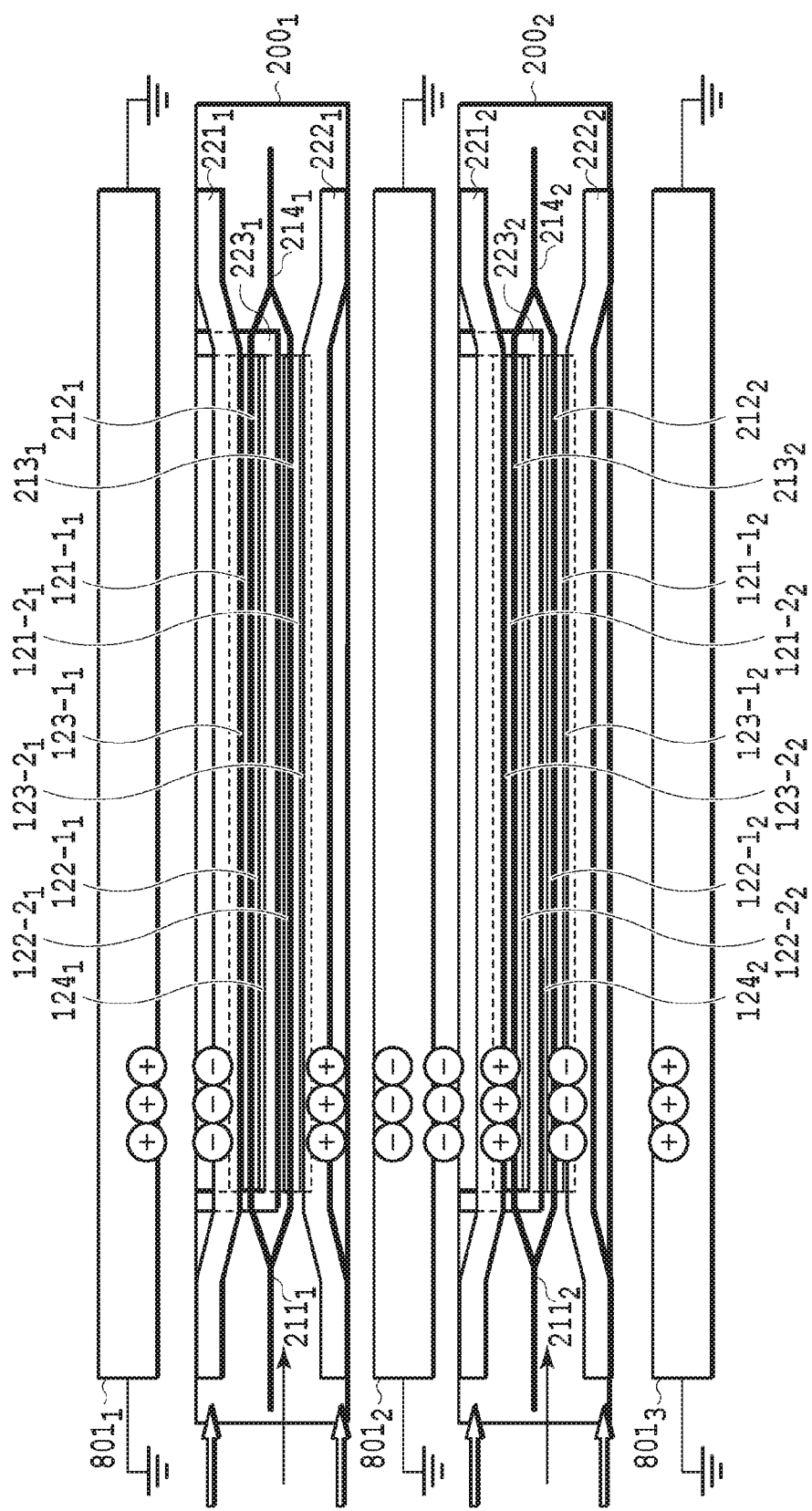
FIG. 10A is a plan view illustrating a configuration of an MZ type optical modulator according to a second embodiment of the invention.

FIG. 10A is a plan view illustrating a configuration of an MZ type optical modulator according to a second embodiment of the invention. As illustrated in FIG. 10A, an optical modulator according to the second embodiment of the invention is configured to include two Si optical modulators 2001 and 2002 having a single-electrode structure and three ground electrodes 8011, 8012, and 8013.

As illustrated in FIG. 10A, the ground electrode 8011 is arranged in parallel to the signal electrode 221 of the Si optical modulator 2001, and the ground electrode 8012 is arranged in parallel to the signal electrode 222 of the Si optical modulator 2001. In addition, the ground electrode 8012 is arranged in parallel to the signal electrode 221 of the Si optical modulator 2002, and the ground electrode 8013 is arranged in parallel to the signal electrode 222 of the Si optical modulator 2002. That is, the ground electrode 8012 is arranged between the Si optical modulators 2001 and 2002. Both side ends of the ground electrodes 8011, 8012, and 8013 are connected to ground pads in a package or the like by wire interconnections or the like.

In the second embodiment, similarly to the first embodiment, most of the electric field generated outside the Si modulators 2001 and 2002 is coupled to the ground electrodes 8011, 8012, and 8013, so that the electric field coupled with conductors arranged around the Si optical modulators 2001 and 2002 can be reduced. According to the second embodiment, since the central ground electrode 8012 is shared by the adjacent Si optical modulators 2001 and 2002, as compared with a case in which the two configurations of the first embodiment are configured independently, the number of the ground electrodes can be reduced. Therefore, in the second embodiment, the area on the chip of the Si optical modulator can be reduced.

In addition, in the second embodiment, the example has been illustrated where the optical modulator is configured to include the two Si optical modulators 2001 and 2002 having a single electrode and the three ground electrodes 8011, 8012, and 8013. However, as illustrated in FIG. 10B, the optical modulator may be configured in the same manner by providing the ground electrodes between the Si optical modulators by using N Si optical modulators 2001 to 201N having a single structure (N is an integer of 2 or more) and N+1 ground electrodes 8011 to 801N+1. The same configuration is also applied to the third embodiment described below.

Third Embodiment

Figure 11A:
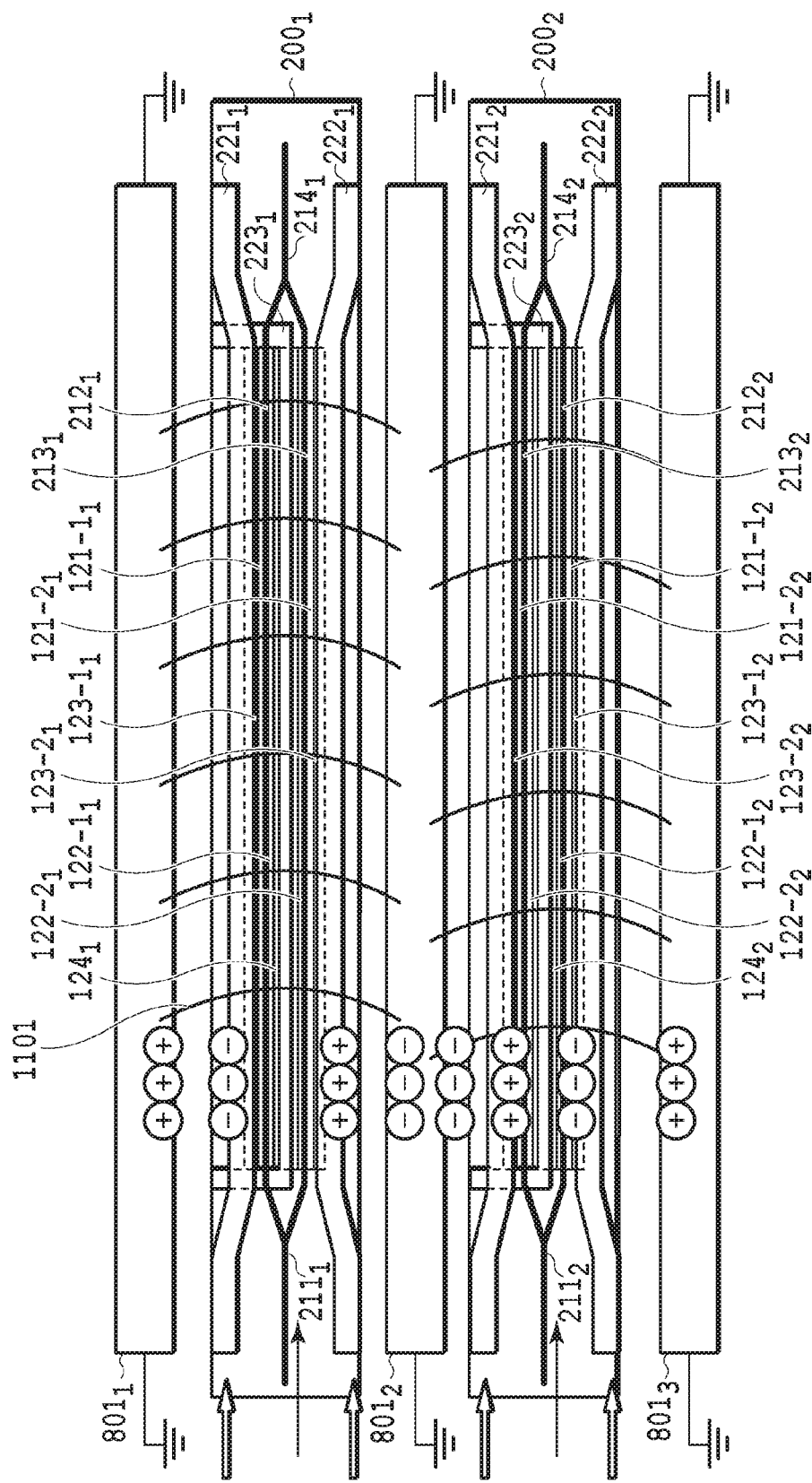
FIG. 11A is a plan view illustrating a configuration of an MZ type optical modulator according to a third embodiment of the invention.

FIG. 11A is a plan view illustrating a configuration of an MZ type optical modulator according to a third embodiment of the invention. As illustrated in FIG. 11A, an optical modulator according to the third embodiment of the invention is configured to include two Si optical modulators 2001 and 2002 having a single electrode and three ground electrodes 8011, 8012 and 8013. These components are arranged in the same manner as the second embodiment. In the third embodiment, the ground electrodes 8011 and 8012 are connected to each other at a plurality of points by wire interconnections 1101, and the ground electrodes 8012 and 8013 are connected to each other at a plurality of points by wire interconnections 1101. Differential signals are applied to the signal electrodes 221 and 222 of the Si optical modulators 2001 and 2002.

In the ground electrode, a radio frequency signal propagating through the signal electrodes 221 and 222 induces a dense portion of positive and negative electric charges. The electric charges induced in the ground electrode move along with the propagation of the radio frequency signal propagating through the signal electrode. However, when the size of the ground electrode is approximate to a multiple of ½ of the wavelength of the radio frequency signal, in some cases, the wave of the induced electric charge distribution may resonate inside the ground electrode. Therefore, in the configurations illustrated in the first and second embodiments, the resonance occurs in the ground electrode depending on the frequency of the signal applied to the signal electrode, and thus, the ground electrode becomes an antenna, so that there is a problem in that a new electric field is generated around the ground electrode.

Herein, conditions under which the ground electrode resonates will be described in detail. The propagation speed of the electromagnetic wave in vacuum is about 3×108 [m/s], and when the refractive index of the ground electrode is 3, the propagation speed of the electromagnetic wave propagating in the ground electrode is estimated to be 1×108 [m/s]. At this time, the wavelength of the radio frequency signal of 10 GHz on the ground electrode is about 10 mm, and the wavelength of the radio frequency signal of 40 GHz is about 2.5 mm. Therefore, for example, in a case in which the length of the ground electrode is 5 mm, since the length of the ground electrode is ½ of the wavelength of the radio frequency signal of 10 GHz, resonance occurs in the ground electrode with a signal of about 10 GHz.

According to the third embodiment, since differential signals are applied to the signal electrodes 221 and 222 of the Si optical modulators 2001 and 2002, due to the structure symmetry, as illustrated in FIG. 11A, electric charges with the opposite signs and the same amounts are induced in the ground electrodes on both sides. Since the ground electrodes on both sides are connected by the wire interconnections 1101, a current flows in the wire interconnections 1101 due to the generated electric charges, and the electric charges with the opposite signs and the same amounts between the ground electrodes cancel each other out. Due to this effect, resonance in the ground electrodes can be prevented.

Herein, as described above, the ground electrodes 8011 and 8012 are connected to each other at a plurality of points by the wire interconnections 1101, and the ground electrodes 8012 and 8013 are connected to each other at a plurality of points by the wire interconnections 1101. It is preferable that the connection interval between the plurality of points is set to be ½ or less of the wavelength of the radio frequency signal. Therefore, resonance at the drive frequency can be suppressed by shortening the resonance length. However, in a case in which it is difficult to set the connection interval to be equal to or less than the interval due to reasons such as the arrangement situation of other wire interconnections 1101, there may be a portion where the interval of the wire interconnections 1101 are not partially ½ or less of the wavelength of the radio frequency signal. Even in this case, since the resonance at the operating frequency does not occur in the portion where the wire interconnections 1101 are connected at an interval of ½ or less of the wavelength of the radio frequency signal, the effect of suppressing most of the resonance can be obtained. In a case in which the interval between the wire interconnections 1101 cannot be set to ½ or less of the wavelength of the radio frequency signal in all the regions, the arrangement intervals of the plurality of wire interconnections 1101 may be set to unequal intervals so that strong resonance does not occur at a specific frequency.

In addition, the absolute value of the amount of electric charges induced in the ground electrode depends on the position on the signal traveling direction axis. Therefore, if the position of the connection point is greatly shifted at the right and left sides, the effect of canceling out the above-mentioned electric charges is weakened, and thus, the resonance is easily induced. Therefore, in this embodiment, it is preferable that a plurality of wire interconnections 1101 be configured so as to connect the ground electrodes with substantially the same position on the signal traveling direction axis in each ground electrode as a connection point.

Figure 11B:
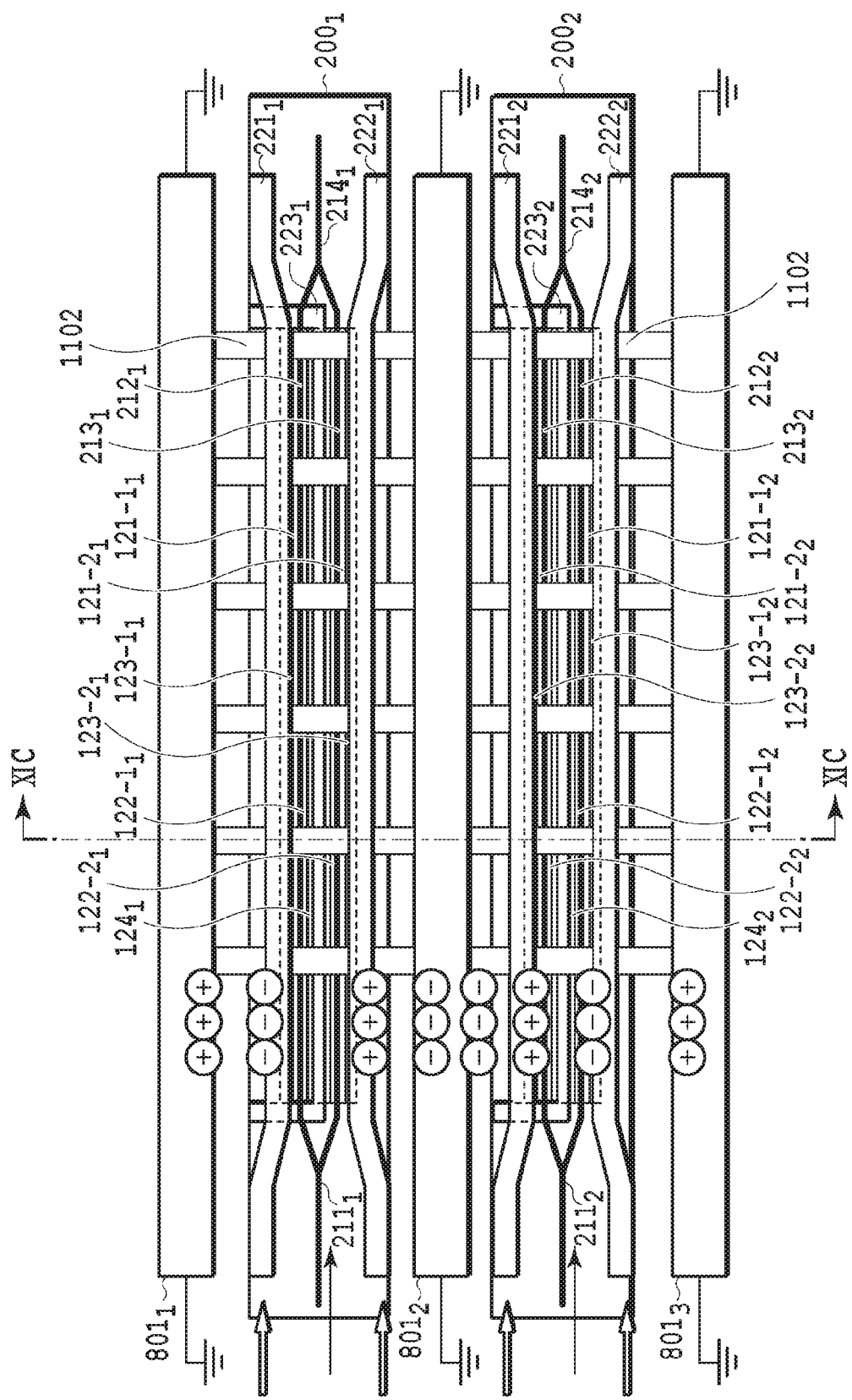
FIG. 11B is a plan view illustrating another example of the configuration of the MZ type optical modulator according to the third embodiment of the invention.

Although the ground electrodes are connected at a plurality of points by using the wire interconnections 1101 in FIG. 11A, the ground electrodes can be connected to each other at a plurality of points by using multilayer interconnections as illustrated in FIG. 11B. FIG. 11B is a plan view illustrating another example of the configuration of the MZ type optical modulator according to the third embodiment, in which the ground electrodes are connected to each other at a plurality of points by using the multilayer interconnections. As illustrated in FIG. 11B, the adjacent ground electrodes 8011 and 8012 and the adjacent ground electrodes 8012 and 8013 are connected to each other by using the multilayer interconnections 1102.

Figure 11C:
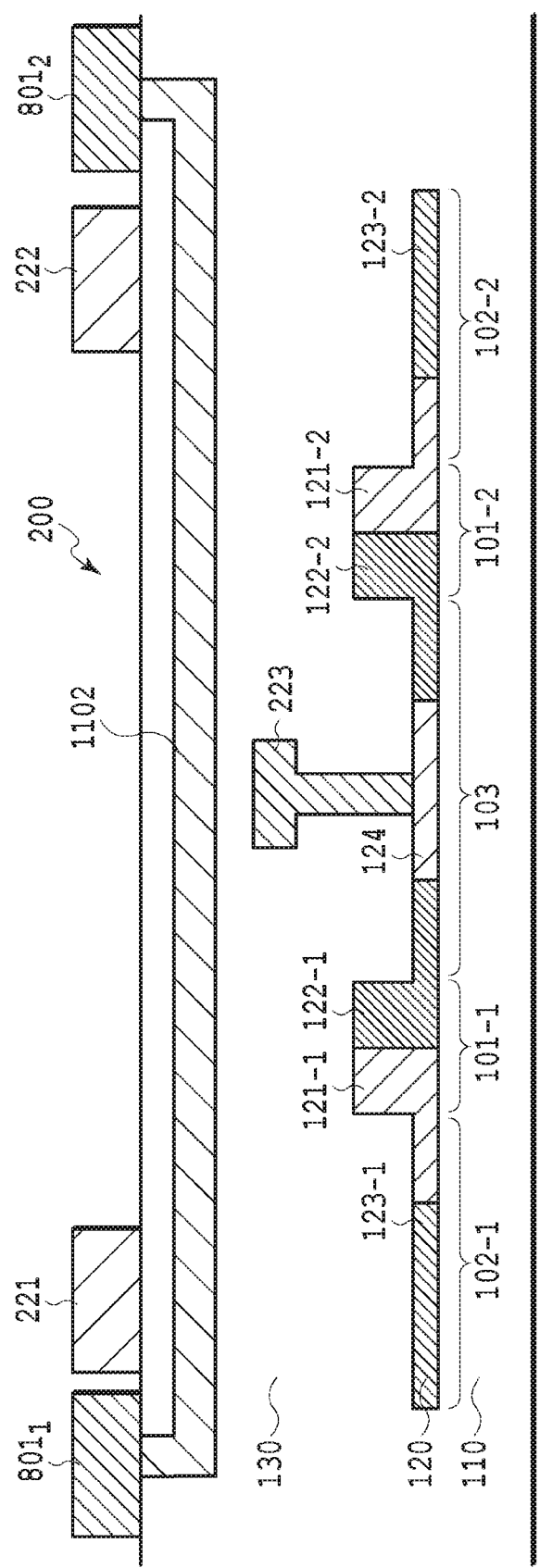
FIG. 11C is a cross-sectional view illustrating still another example of the configuration of the MZ type optical modulator according to the third embodiment of the invention.

FIG. 11C is a cross-sectional view taken along line XIC-XIC of the MZ type optical modulator illustrated in FIG. 11B. As illustrated in FIG. 11C, the multilayer interconnections 1102 are formed in lower layers of the ground electrodes 8011 to 8013 and the signal electrodes 221 and 222 and upper layers of the optical waveguide layers such as the rib portion 101. In the MZ type optical modulator illustrated in FIGS. 11B and 11C, in a case where the multilayer interconnection 1102 and the rib portion 101 are close to each other, light loss occurs. In order to prevent the occurrence of this loss, it is preferable that the multilayer interconnections 1102 are formed in upper layers spaced by 0.6 μm or more apart from the rib portion 101.

Fourth Embodiment

Figure 12:
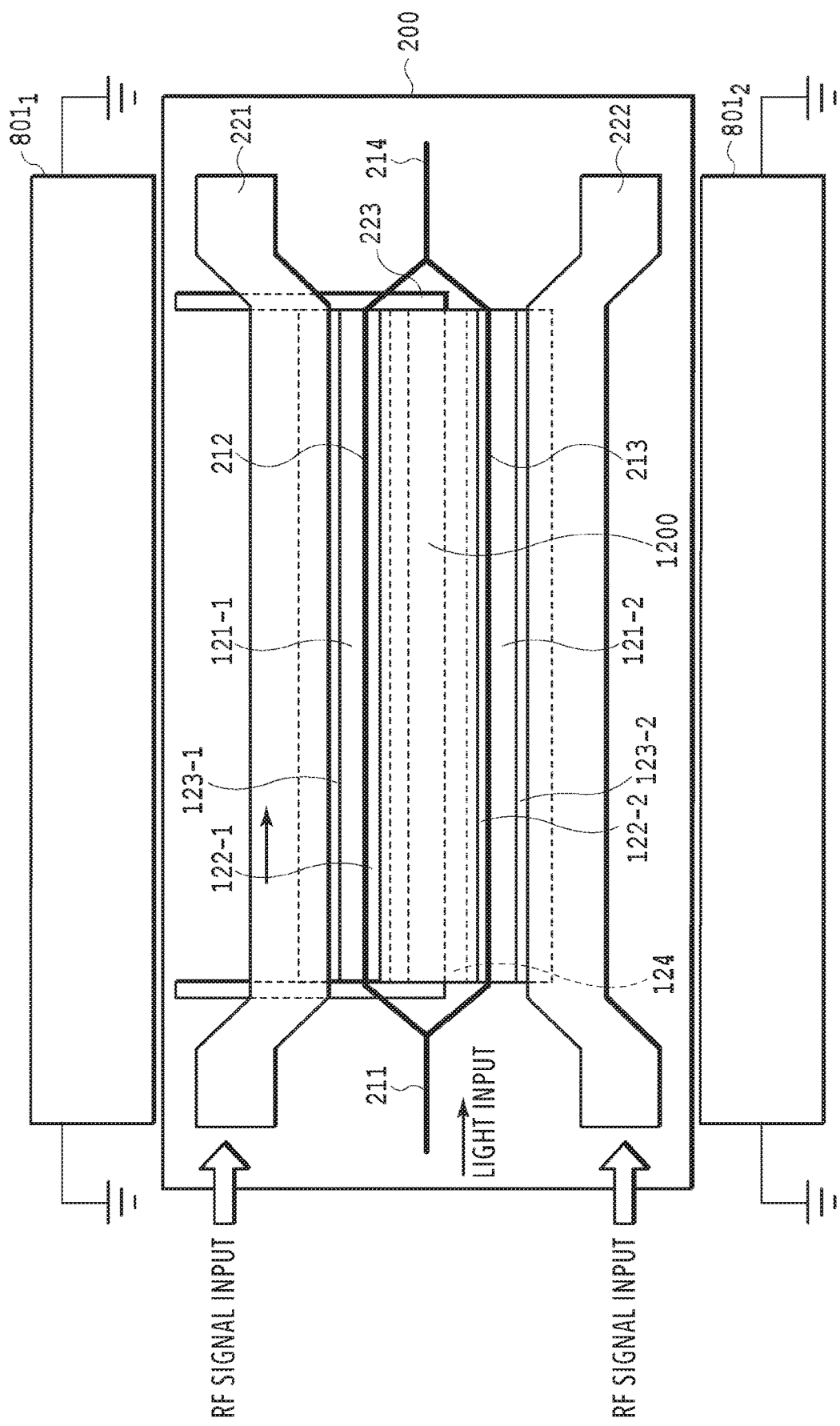
FIG. 12 is a plan view illustrating a configuration of an MZ type optical modulator according to a fourth embodiment of the invention.

FIG. 12 is a plan view illustrating a configuration of an MZ type optical modulator according to a fourth embodiment of the invention. As illustrated in FIG. 12, an MZ type optical modulator according to the fourth embodiment of the invention is configured to include a Si optical modulator 200 having a single electrode, a ground electrode 8011 arranged in parallel to a signal electrode 221, and a ground electrode 8012 arranged in parallel to a signal electrode 222. A shield portion 1200 is formed around a DC electrode 223 of the Si optical modulator 200.

Figure 13A:
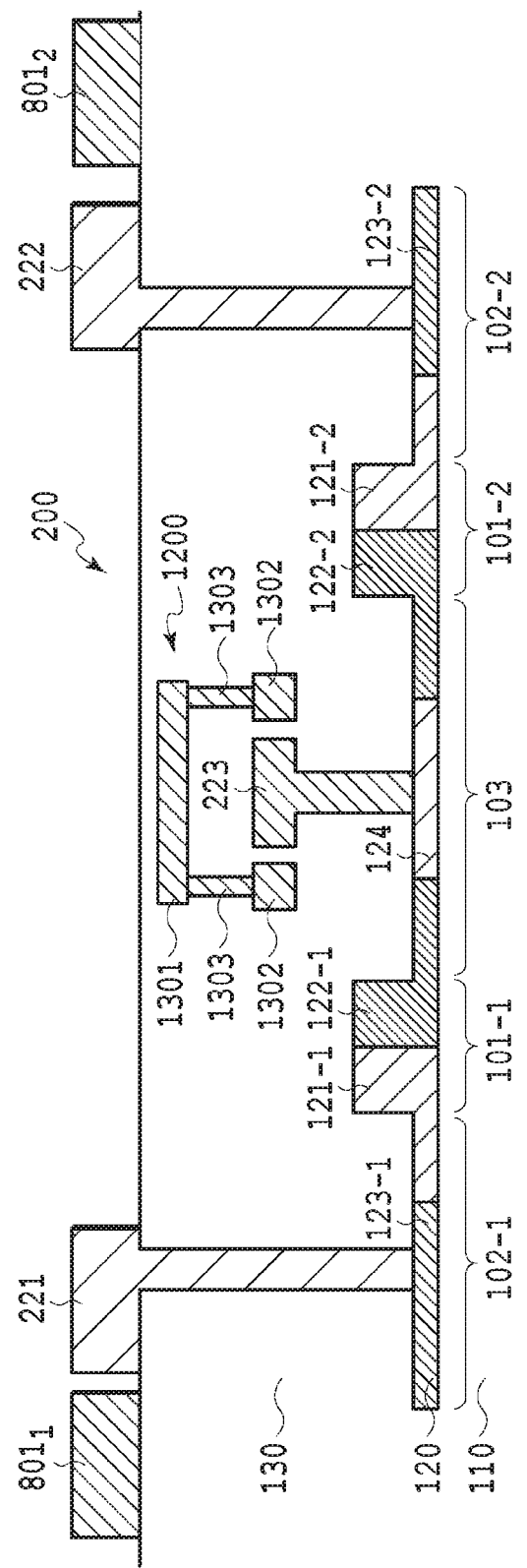
FIG. 13A is a cross-sectional view illustrating the configuration of the MZ type optical modulator according to the fourth embodiment of the invention.

FIG. 13A is a cross-sectional view illustrating the configuration of the MZ type optical modulator according to the fourth embodiment of the invention. As illustrated in FIG. 13A, the shield portion 1200 is configured to include an upper layer interconnection 1301 formed above a layer used as the DC electrode 223, a lower layer interconnection 1302 formed below the upper layer interconnection 1301, and a via 1303 connecting the upper layer interconnection 1301 and the lower layer interconnection 1302. The upper layer interconnection 1301, the lower layer interconnection 1302, and the via 1303 are configured to be electrically connected to each other so as to at least partly surround the DC electrode 223. Both-side ends are connected to the ground of a package or the like.

Considering the above-described electric charge generation model, there is a possibility that resonance occurs at the DC electrode 223 due to the radio frequency signal applied to the signal electrodes 221 and 222. When resonance occurs at the DC electrode 223, the potential applied to the DC electrode 223 is changed, so that the quality of the optical signal to be generated is deteriorated. According to this embodiment, due to the shield effect of the shield portion 1200 arranged above and on the left and right sides of the DC electrode 223, it is possible to suppress unstabilization of the potential of the DC electrode 223 caused by the electric field generated from the signal electrodes 221 and 222.

Figure 13B:
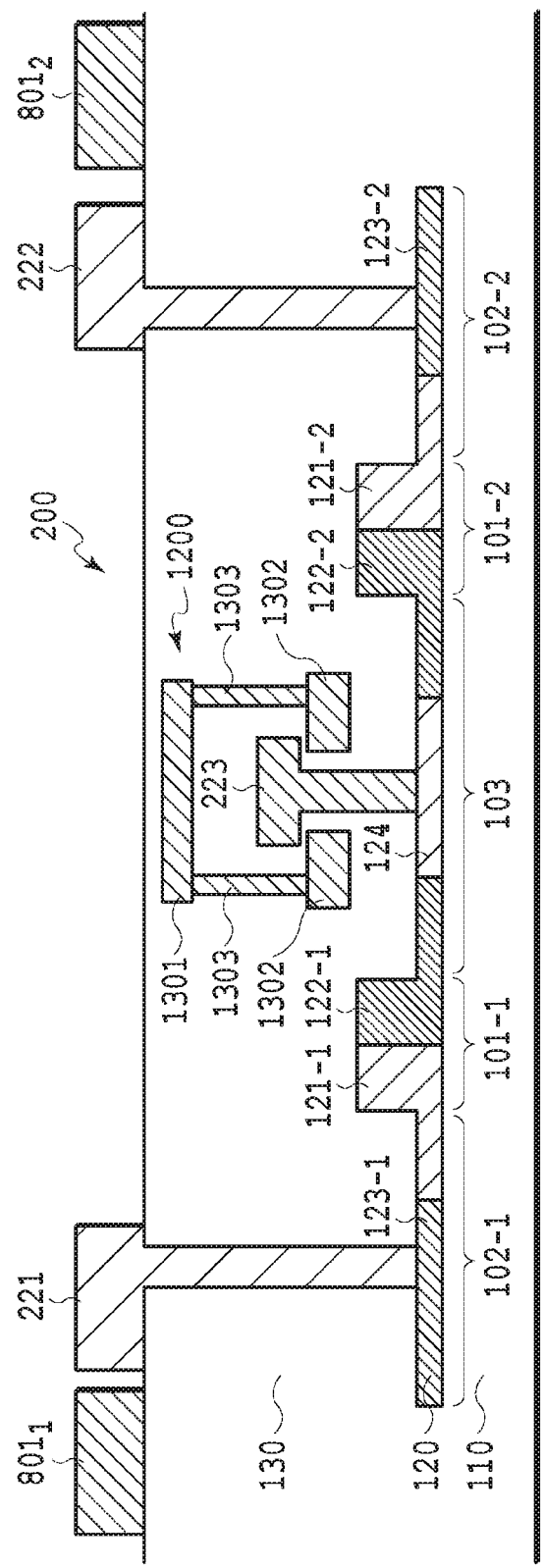
FIG. 13B is a cross-sectional view illustrating another example of the configuration of the MZ type optical modulator according to the fourth embodiment of the invention.

In this embodiment, although the configuration has been described in which the shield portion 1200 covers the upper surface and the left and right sides of the DC electrode 223, the same effect may be obtained by covering only the upper surface of the DC electrode 223 or only the left and right sides thereof. In addition, the same effect may be obtained by partially arranging the shield portion 1200 or by arranging a plurality of the shield portions 1200. In addition, as illustrated in FIG. 13B, it is also possible to cover all of the above and below and the left and right sides of the DC electrode 223 with the shield portions 1200.

Fifth Embodiment

Figure 14:
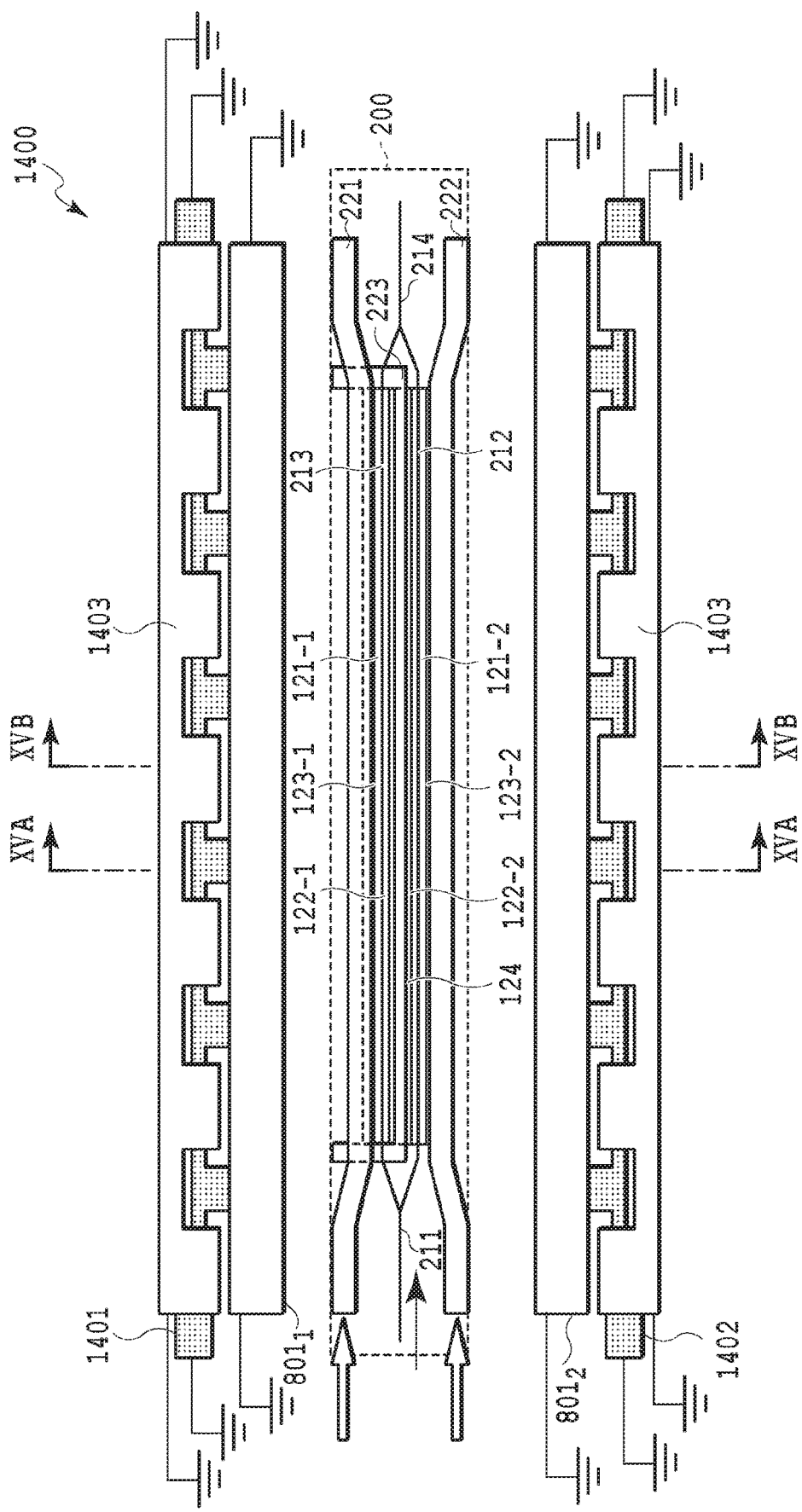
FIG. 14 is a plan view illustrating a configuration of an MZ type optical modulator according to a fifth embodiment of the invention.

FIG. 14 is a plan view illustrating a configuration of an MZ type optical modulator according to a fifth embodiment of the invention. As illustrated in FIG. 14, an MZ type optical modulator 1400 according to the fifth embodiment of the invention is configured to include a Si optical modulator 200, two ground electrodes 8011 and 8012, and ground interconnections 1401 and 1402 shielded by a shield portion 1403.

Figure 15A:
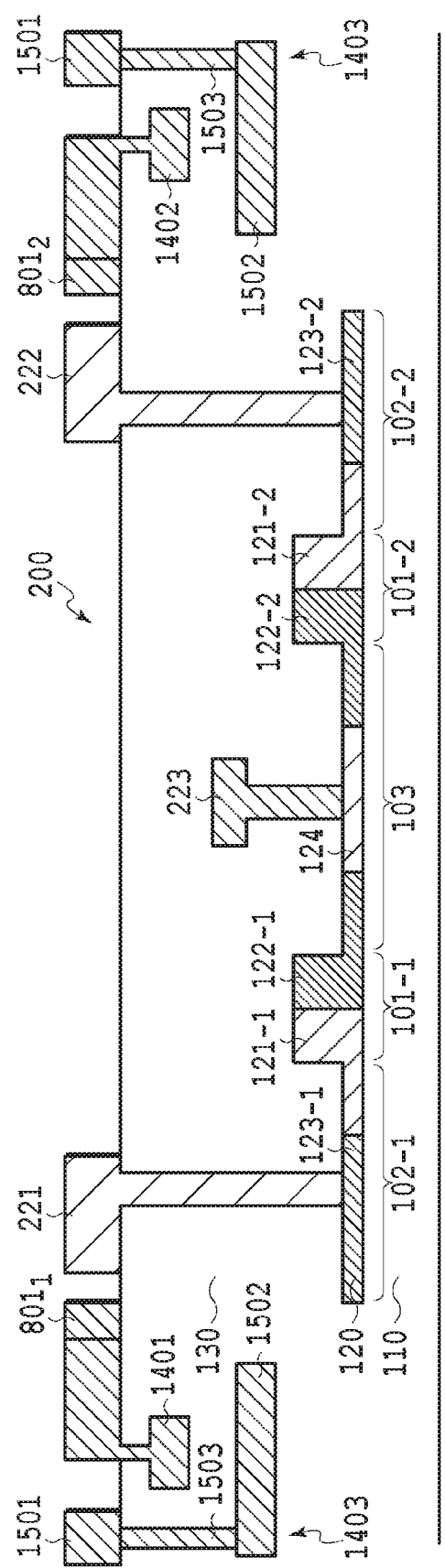
FIG. 15A is a cross-sectional view illustrating the configuration of the MZ type optical modulator according to the fifth embodiment of the invention.
Figure 15B:
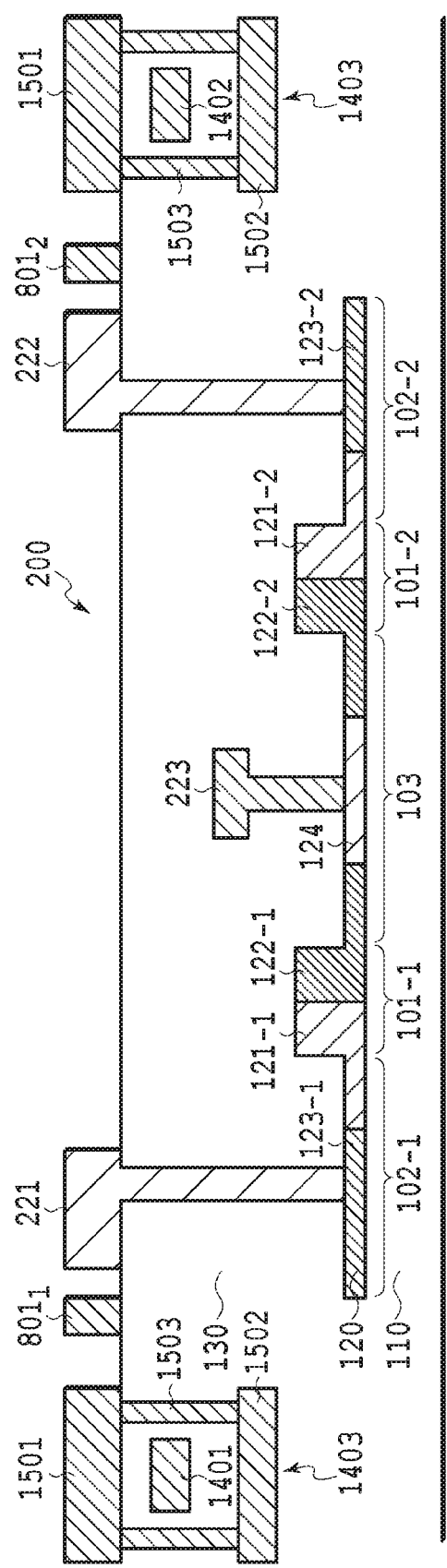
FIG. 15B is a cross-sectional view illustrating the configuration of the MZ type optical modulator according to the fifth embodiment of the invention.

FIG. 15A is a cross-sectional view taken along line XVA-XVA the configuration of the MZ type optical modulator according to the fifth embodiment of the invention. FIG. 15B is a cross-sectional view taken along line XVB-XVB of the configuration of the MZ type optical modulator according to the fifth embodiment of the invention. As illustrated in FIGS. 15A and 15B, the shield portion 1403 is configured to include a surface interconnection 1501, a lower layer interconnection 1502, and a via 1503 connecting the surface interconnection 1501 and the lower layer interconnection 1502. As illustrated in FIG. 15B, the surface interconnections 1501, the lower layer interconnections 1502 and the via 1503 at least partially surround the ground interconnections 1401 and 1402 which are the middle layer interconnections, so that the ground interconnections 1401 and 1402 are shielded. In addition, as illustrated in FIG. 15A, the ground interconnections 1401 and 1402 are partially connected to the ground electrodes 8011 and 8012 through the surface interconnection 1501. In addition, the ground interconnections 1401 and 1402 and the shield portion 1403 are connected to the ground of a package or the like.

According to this embodiment, the ground interconnections 1401 and 1402 are coupled to the ground electrodes 8011 and 8012 at a plurality of positions, respectively, so that electric charges induced in the ground electrodes 8011 and 8012 flow in the ground through the respective coupling positions for the ground interconnections 1401 and 1402. Therefore, it is possible to suppress the resonance phenomenon of the ground electrode discussed in the third embodiment. In addition, since most of the ground interconnections 1401 and 1402 are shielded by using the shield portion 1403, it is possible to supply a stable ground potential without being influenced by an external electric field.

In addition, although the shield portion 1403 is provided so as to surround the ground interconnections 1401 and 1402 in this embodiment, the same effect can also be obtained in a case where the ground interconnections are shielded by only the vias, only the lower layer interconnections, or the like. In addition to the shield portion 1403, a shield portion 1200 surrounding the DC electrode 223 may be added to the configuration.

Sixth Embodiment

Figure 16:
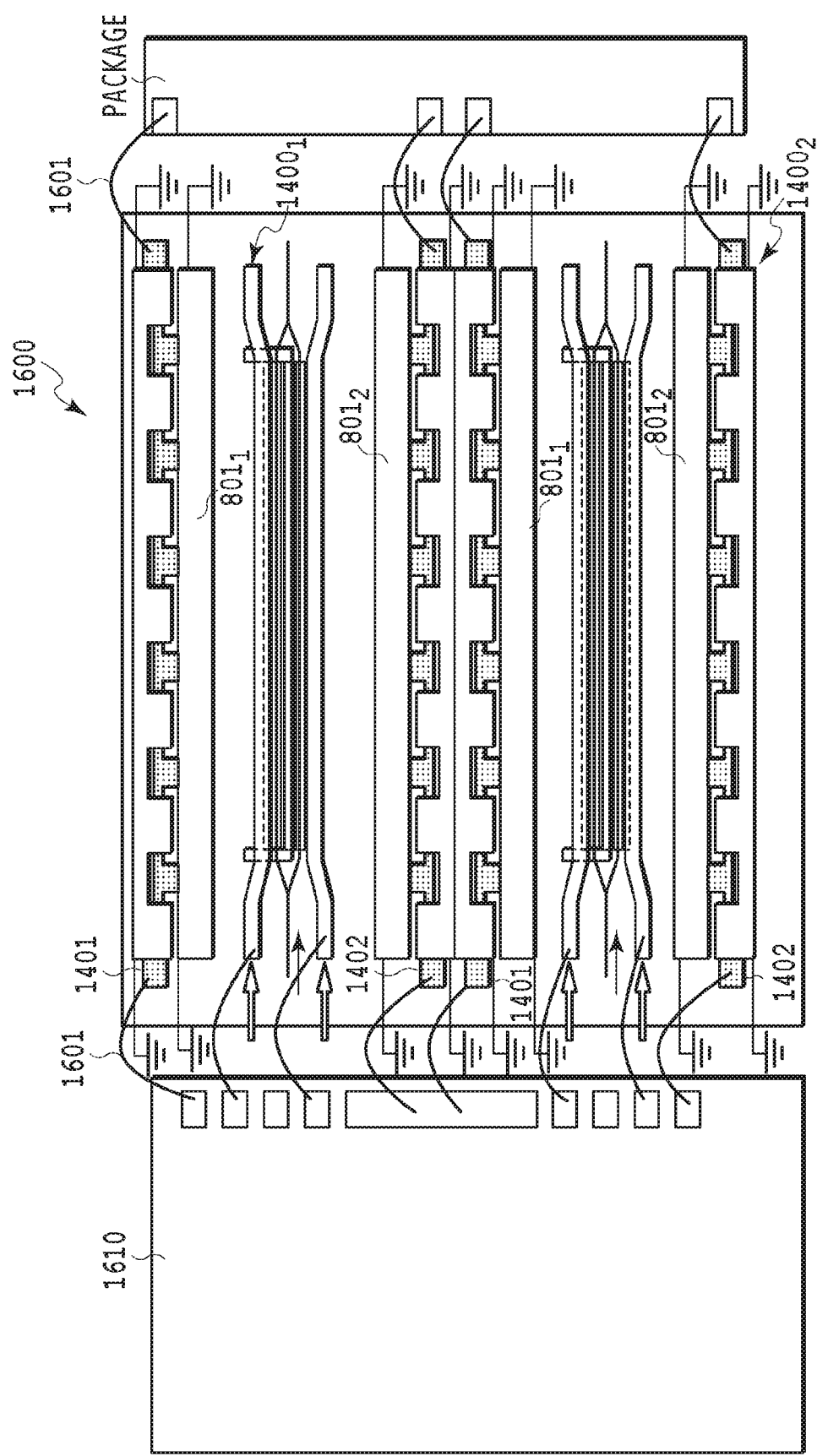
FIG. 16 is a plan view illustrating a configuration of an MZ type optical modulator according to a sixth embodiment of the invention.

FIG. 16 is a plan view illustrating a configuration of an MZ type optical modulator according to a sixth embodiment of the invention. As illustrated in FIG. 16, an MZ type optical modulator 1600 according to the sixth embodiment of the invention is configured to include the MZ type optical modulators 14001 and 14002 according to the fifth embodiment and a driver 1610.

As illustrated in FIG. 16, the electrode pad surface of the driver 1610 is arranged on substantially the same plane as the electrode pad surfaces of the MZ type optical modulators 14001 and 14002. Differential signal output pads of the driver 1610 and differential signal input pads of the MZ type optical modulators 14001 and 14002 are connected by wire interconnections 1601. A ground pad of the driver 1610 is connected to one-side ends of the ground interconnections 1401 and 1402 of the MZ type optical modulators 14001 and 14002. The other-side ends of the ground interconnections 1401 and 1402 of the MZ type optical modulators 14001 and 14002 are connected to a package (ground) through wire interconnections 1601.

Although the ground pad of the driver 1610 is connected only to the ground interconnections 1401 and 1402 of the MZ type optical modulators 14001 and 14002 in this embodiment, the ground pad of the driver may be connected one or a plurality of the ground interconnections 1401 and 1402, the ground electrodes 8011 and 8012, and the shield portions 1200 and 1403 (not illustrated in FIG. 16).

Herein, in this embodiment, it is preferable that an open collector type driver is used as the driver 1610. The open collector type driver is a driver having a structure in which termination resistors of drivers are not integrated, as described in NPL 3. It has been reported that, as compared with the case of using an ordinary driver having integrated termination resistors, by using an open collector type driver for driving an optical modulator, power consumption in the open collector type driver and the modulator can be reduced.

In addition, the ground pad of the open collector type driver can have a strong ground potential on the back side due to a conductivity of a substrate, but since a Si optical modulator uses a high resistance substrate, it is difficult to take the ground of the electrode pad in a silicon chip.

In this embodiment, by using an open collector type driver as the driver 1610, by connecting to the ground interconnections 1401 and 1402 and/or the ground electrodes 8011 and 8012 with a strong ground potential of the open collector type driver 1610, the potentials of the ground electrodes 8011 and 8012 can be stabilized. Therefore, it is possible to further suppress the resonance in the ground electrode.

As described above, in the optical modulator according to the invention, electromagnetic interaction with surrounding structures can be further reduced. For this reason, even in a case where the DC electrode is arranged around the signal electrode, it is possible to solve adverse effects such as a deterioration in waveform quality at the time of high speed modulation due to a deterioration in frequency response characteristic of the optical modulator, and an increase in signal crosstalk in the transmission light signal or between transmission and reception. Therefore, it is possible to provide an optical modulator which is excellent in radio frequency characteristics and good in waveform quality and in which various elements are integrated at high density.

REFERENCE SIGNS LIST optical waveguide structure 100
rib portion 101
slab portion 102, 103
lower $SiO_2$ clad layer 110
Si layer 120
medium-concentration p-type semiconductor region 121
medium-concentration n-type semiconductor region 122
high-concentration p-type semiconductor region 123
high-concentration n-type semiconductor region 124
upper $SiO_2$ clad layer 130
Si optical modulator 200
input optical waveguide 211
arm waveguide 212, 213
output optical waveguide 214
signal electrode 221, 222
DC electrode 223
structure 701
MZ type optical modulator 800, 1400, 1600
ground electrode 801
wire interconnection 1101, 1601
multilayer interconnection 1102
shield portion 1200, 1403
upper layer interconnection 1301
lower layer interconnection 1302, 1502
via 1303, 1503
ground interconnection 1401, 1402
surface interconnection 1501
driver 1610

The invention claimed is:

1. An MZ optical modulator comprising:
a Si optical modulator including an input optical waveguide, two arm waveguides for branching and guiding light input from the input optical waveguide, an output optical waveguide for combining the light guided through the two arm waveguides and outputting the combined light, two signal electrodes for applying radio frequency modulation signals that are arranged in parallel to the two arm waveguides respectively, and a DC electrode for applying a bias voltage that is provided between the two signal electrodes; and
at least two ground electrodes arranged in parallel to the two signal electrodes,
wherein the radio frequency modulation signals input to the two signal electrodes are a pair of differential signals,
wherein the at least two ground electrodes are arranged on both sides of the Si optical modulator and are connected to each other at a plurality of points by electrical multilayer interconnections.

2. The MZ optical modulator according to claim 1, further comprising:
N Si optical modulators arranged in parallel (N is an integer of two or more),
N+1 ground electrodes that are arranged in parallel on both sides of the Si optical modulators, and
wherein the ground electrode provided between adjacent Si optical modulators is shared by the adjacent Si optical modulators.

3. The MZ optical modulator according to claim 1, wherein a distance between the plurality of points is ½ or less of a wavelength of the radio frequency modulation signal.

4. The MZ optical modulator according to claim 1, further comprising a shield portion including multilayer interconnections comprising a surface layer interconnection and a lower layer interconnection connected to ground interconnections, and a via connecting the surface layer interconnection and the lower layer interconnection, wherein the shield portion at least partially surrounds the ground interconnection.

5. The MZ optical modulator according to claim 1, further comprising a shield portion including multilayer interconnections comprising an upper layer interconnection and a lower layer interconnection connected to ground interconnections, and a via connecting the upper layer interconnection and the lower layer interconnection, wherein the shield portion at least partially surrounds the DC electrode.

6. An optical modulator comprising:
the MZ optical modulator according to claim 1; and
a driver arranged on the same plane as the MZ optical modulator,
wherein the ground electrodes are electrically connected to a ground pad arranged in the driver by electric interconnection.

7. An optical modulator comprising:
the MZ optical modulator according to claim 4; and
a driver arranged on the same plane as the MZ optical modulator,
wherein one or a plurality of the ground electrodes, the ground interconnections, and the shield portion are electrically connected to a ground pad arranged in the driver by electric interconnection.

8. An optical modulator comprising:
the MZ optical modulator according to claim 5; and
a driver arranged on the same plane as the MZ optical modulator,
wherein one or a plurality of the ground electrodes, the ground interconnections, and the shield portion are electrically connected to a ground pad arranged in the driver by electric interconnection.

* * * * *